United States Patent
Baxter

(10) Patent No.: US 6,675,306 B1
(45) Date of Patent: Jan. 6, 2004

(54) METHOD AND APPARATUS FOR PHASE-LOCK IN A FIELD PROGRAMMABLE GATE ARRAY (FPGA)

(75) Inventor: Michael A. Baxter, Sunnyvale, CA (US)

(73) Assignee: Ricoh Company Ltd., Tokyo (JP)

( * ) Notice: Subject to any disclaimer, the term of this patent is extended or adjusted under 35 U.S.C. 154(b) by 0 days.

(21) Appl. No.: 09/523,449

(22) Filed: Mar. 10, 2000

(51) Int. Cl.[7] .................................................. G06F 1/12
(52) U.S. Cl. ........................ 713/400; 713/400; 713/401; 370/215; 716/16
(58) Field of Search ................................. 713/400, 401; 370/215; 716/16

(56) References Cited

U.S. PATENT DOCUMENTS

| | | | |
|---|---|---|---|
| 4,679,213 A | | 7/1987 | Sutherland .................... 377/66 |
| 4,837,740 A | | 6/1989 | Sutherland .................. 364/900 |
| 5,079,519 A | * | 1/1992 | Ashby et al. ................ 331/1 A |
| 5,124,569 A | * | 6/1992 | Phillips ....................... 327/150 |
| 5,173,617 A | | 12/1992 | Alsup et al. ................ 307/269 |
| 5,187,800 A | | 2/1993 | Sutherland .................. 395/800 |
| 5,610,543 A | | 3/1997 | Chang et al. ............... 327/158 |
| 5,638,008 A | | 6/1997 | Rangasayee et al. .......... 326/39 |
| 5,638,016 A | | 6/1997 | Eitrheim ..................... 327/175 |
| 5,771,264 A | * | 6/1998 | Lane .......................... 375/376 |
| 5,854,918 A | | 12/1998 | Baxter ........................ 395/555 |
| 5,861,780 A | * | 1/1999 | Fukuda ........................ 331/57 |
| 6,031,426 A | * | 2/2000 | Yechuri ......................... 331/2 |
| 6,067,508 A | * | 5/2000 | Conn, Jr. .................... 702/132 |
| 6,094,081 A | * | 7/2000 | Yanagiuchi ................. 327/258 |
| 6,127,865 A | * | 10/2000 | Jefferson .................... 327/149 |
| 6,140,852 A | * | 10/2000 | Fischer et al. .............. 327/156 |
| 6,198,353 B1 | * | 3/2001 | Janesch et al. ................ 331/16 |
| 6,219,797 B1 | * | 4/2001 | Liu et al. .................... 713/500 |
| 6,320,574 B1 | * | 11/2001 | Eglit ........................... 345/213 |
| 6,496,971 B1 | * | 12/2002 | Lesea et al. .................. 716/16 |

FOREIGN PATENT DOCUMENTS

EP 0471932 B1 6/1991

OTHER PUBLICATIONS

Actel Corporation Application Note 4, "Using FPGAs for Digital PLL Applications," pp. 4–85 to 4–88, Apr. 1996.*

Beaven, P.A., "Phase–Locked Clock Generator", IBM Technical Disclosure Bulletin, vol. 22, No. 8B, Jan. 1980, pp. 3835–3838.

Chrisfield, R.P.; Doan, D.T.; Williams, K.R. and Wrage, R.H., "Phase–Locked Clocking", IBM Technical Disclosure Bulletin, vol. 23, No. 7A, Dec. 1980, pp. 2924–2926.

Calvo, J.; Acha, J.I. and Valencia, M., "Asynchronous Modular Arbiter", IEEE Transactions On Computers, vol. C–35, No. 1, Jan. 1986, pp. 67–70.

Dunning, J.; Garcia, G., Lundberg, J. and Nuckolls, E., "An All–Digital Phase–Locked Loop With 50–Cycle Lock Time Suitable For High–Performance Microprocessors", IEEE Journal Of Solid–State Circuits, vol. 30, No. 4, Apr. 1995, pp. 412–422.

El Guibaly, F., "Design And Analysis Of Arbitration Protocols", IEEE Transactions On Computers, vol. 38, No. 2, Feb. 1989, pp. 161–171.

(List continued on next page.)

Primary Examiner—Thomas Lee
Assistant Examiner—Michael A Nieves
(74) Attorney, Agent, or Firm—Fenwick & West LLP

(57) ABSTRACT

An apparatus for performing phase-lock in a field programmable gate array includes a phase detector configured to determine a phase difference between a carry logic oscillator signal and a reference clock signal; and a combinational circuit coupled to the phase detector, and adapted to function as a variable carry logic oscillator, and further configured to generate the carry logic oscillator signal. A method for performing phase-lock in a field programmable gate array includes: using a carry logic oscillator in a field programmable gate array to generate a carry logic oscillator signal; and determining a phase difference between the carry logic oscillator signal and a reference clock signal.

19 Claims, 11 Drawing Sheets

OTHER PUBLICATIONS

Furber, S.B., "The Return Of Asynchronous Logic", Accessed at http://maveric0.uwaterloo.ca/amulet/async/async_desc.html#Ref2, pp. 1–6.

Grice, D.G., "PLA Implementation Of A PLO", IBM Technical Disclosure Bulletin, vol. 19, No. 7, Dec. 1976, pp. 2600–2602.

Hauck, S., "Asynchronous Design Methodologies: An Overview", Accessed at http://www.eecs.nwu.edu/~hauck/HTMLpapers/AsynchArt/AsynchArt.html., pp. 1–39.

Lee, T.H.; Donnelly; K.S., Ho, J.T.C.; Zerbe, J.; Johnson, M.G. and Ishikawa, T., "A 2.5 V CMOS Delay–Locked Loop For An 18 Mbit, 500 Megabyte/s DRAM", IEEE Journal Of Solid–State Circuits, vol. 29, No. 12, Dec. 1994, pp. 1491–1496.

Leung, W.C., "Digital Phase–Locked Loop Circuit", IBM Technical Disclosure Bulletin, vol. 18, No. 10, Mar. 1976, pp. 3334–3337.

Lindsey, W.C. and Simon, M.K., "Carrier Synchronization And Detection Of Polyphase Signals", IEEE Transactions On Communications, Jun. 1972, pp. 441–454.

Maniwa, R.T., "Global Distribution: Clock And Power", Accessed at http://www.eedesign.com/Editorial/1995/CoverStory9508.html, pp. 1–10.

Martin, A.J.; Burns, S.M.; Lee, T.K.; Borkovic, D. and Hazewindus, P.J., "The Design Of An Asynchronous Microprocessor", Proceedings Of The Decennial Caltech Conference On VLSI Mar. 1989, pp. 351–373.

McConnel, S.R. and Siewiorek, D.P., "Synchronization And Voting", IEEE Transactions On Computers, vol. C–30, No. 2, Feb. 1981, pp. 161–164.

McDonald, J.F., "F–RISC/G And Beyond—Subnanosecond Fast RISC For TeraOps Parallel Processing Applications", Accessed at http://inp.cie.rpi.edu/research/mcdonald.frisc/reports/Fall94/f94.html, pp. 1–39.

Messerschmitt, D.G., "Frequency Detectors For PLL Acquisition In Timing And Carrier Recovery", IEEE Transactions On Communications, vol. Com–27, No. 9, Sep. 1979, pp. 1288–1295.

Moro, S; Nishio, Y. and Mori, S., "Synchronization Phenomena In RC Oscillators Coupled By One Resistor", Accessed at http://www.mori.elec.keto.ac.jp~moro/PAPERS/1995/e-16.html, pp. 1–2.

Newman, E.L., "Voltage–Controlled Oscillator", IBM Technical Disclosure Bulletin, vol. 19, No. 10, Mar. 1977, pp. 3899–3900.

Sadr, R.; Shah, B.N. and Hinedi, S.M., "Parallel Digital Phase–Locked Loops", NASA Tech Brief vol. 19, No. 5, Item #84 From JPL New Technology Report NPO–19044, Jun. 1995, pp. i–25a.

Sari, H. and Moridi, S., "New Phase And Frequency Detectors For Carrier Recovery In PSK And QAM Systems", IEEE Transactions On Communications, vol. 36, No. 9, Sep. 1988, pp. 1035–1043.

Spilker, J.J. and Magill, D.T., "The Delay–Lock Discriminator–An Optimum Tracking Device", Proceedings Of The IRE, Sep. 1961, pp. 1403–1416.

Sproull, B. and Sutherland, I., "Asynchronous Processor Design", Fiscal 1994 Project Portfolio Report, Accessed at http://www.sunlabs.com/smli/technical–reports/annualreport94/asynch.html, pp. 1–2.

Sutherland, I., "Micropipelines", Communications Of The ACM, vol. 32, No. 6, Jun. 1989, pp. 720–738.

Vanichayobon, S., "Two–Phase Locking (2PL)", Accessed at http://csgrad.cs.vt.edu~sirirut/2PL, pp. 1–7.

Wilkinson, B., "Comments On "Design And Analysis Of Arbitration Protocols"", IEEE Transactions On Computers, vol. 41, No. 3, Mar. 1992, pp. 348–351.

Williams, M., "Fujitsu Introduces new 256–Megabyte Memory Chip Feb. 7, 1997", Accessed at http://www.hb–pacifica.com/headline/fujitsuintroducesnew2_860.shtml, pp. 1–2.

Woo, T., "A Novel Switching Architecture For ATM Networks", IEEE Transactions On Communications, vol. 45, No. 4, Apr. 1997, pp. 411–415.

Wooton, R.M., "Auto–Reference Phase–Locked–Loop Clock Generator", IBM Technical Disclosure Bulletin, vol. 24, No. 5, Oct. 1981, pp. 2294–2296.

"The AMULET1 Microprocessor", Accessed at http://www.cs.man.ac.uk.amulet.AMULET1_uP.html, pp. 1–2.

"High–Precision Phase–Synchronization Technology Using An SDH Network", Accessed at http://www.nttinfo.ntt.jp/RD/1995rev/telecom/tel02.html., p. 1.

"Chapter 6: Implementation", Accessed at http://maveric0waterloo.ca/amulet/staff/details/phil/research/thesis/chap6.html, pp. 1–28.

IEEE Transactions On Communications, vol. 44, No. 6, Jun. 1996, pp. 645–760.

"Phase– And Delay–Locked Loops Technical Briefs", Accessed at http://www.Isilogic.com/products/5_12a.html#PLL/DLL, pp. 1–9.

"The Phase–Locked Loop", Accessed at http://yake.ecn.purdue.edu~roos/modem/pil/pil.html, pp. 1–3.

"PLL: Phase Locked Loop", ASIC Semiconductor International Corp., Accessed at http://www.asicasic.com/app_notes/PLL/pll.html, pp. 1–13.

"References For Synchronization, And Radio Architectures In Digital Communications", Accessed At http://www.ee.vt-.edu/ee/nitin/biblio.html, pp. 1–14.

"Scheduled Clock Skewed", Accessed at http://www.ece.ncsu.edu/erl/faculty/wtl_data/hsieh.html, pp. 1–2.

"Sonet", Accessed at http://bugs.wpi.edu:8080/EE535/hwk11cd95/dks1/dks1.html, pp. 1–35.

Walters, Stephen M.; Troudet, Terry, "Digital Phase–Locked Loop With Jitter Bounded", IEEE Transactions On Circuits And Sysyems, vol. 36, No. 7, Jul. 1989; pp. 980–987.

\* cited by examiner

Carry Logic Oscillator (CLO)

| ROWS | Mode | External CLB Carry Equation | Internal CLB Carry Equation | OrCAD |
|---|---|---|---|---|
| 1 | ADD-F-C1 | COUT1=(G4*G1)+COUT0*(G4+G1) | COUT0=(F1*F2)+CIN*(F1+F2) | |
| 2 | ADD-FG-C1 | COUT1=(G4*G1)+COUT0*(G4+G1) | COUT0=(F1*F2)+CIN*(F1+F2) | |
| 3 | ADD-G-C1 | COUT1=(G4*G1)+COUT0*(G4+G1) | COUT0=CIN | |
| 4 | ADD-G-F1 | COUT1=(G4*G1)+COUT0*(G4+G1) | COUT0=F1 | |
| 5 | ADD-G-F3 | COUT1=(G4*G1)+COUT0*(G4+G1) | COUT0=F3 | |
| 6 | SUB-F-C1 | COUT1=(G4-G1)+COUT0*(G4+-G1) | COUT0=(F1*-F2)+CIN*(F1+-F2) | |
| 7 | SUB-FG-C1 | COUT1=(G4-G1)+COUT0*(G4+-G1) | COUT0=(F1*-F2)+CIN*(F1+-F2) | |
| 8 | SUB-G-1 | COUT1=(G4*-G1)+COUT0*(G4+-G1) | COUT0=1 | |
| 9 | SUB-G-F1 | COUT1=(G4*-G1)+COUT0*(G4+-G1) | COUT0=F1 | |
| 10 | SUB-G-C1 | COUT1=(G4*-G1)+COUT0*(G4+-G1) | COUT0=CIN | |
| 11 | SUB-G-F3 | COUT1=(G4*-G1)+COUT0*(G4+-G1) | COUT0=-F3 | |
| 12 | ADDSUB-F-C1 | COUT1=F3*((G4*G1))+COUT0*(G4+G1))+F3*-((G4*-G1))+COUT0*(G4+-G1)) | COUT0=F3*((F1*F2)+CIN*(F1+F2))+F3*-((F1*-F2)+CIN*(F1+-F2)) | |
| 13 | ADDSUB-FG-C1 | COUT1=F3*((G4*G1))+COUT0*(G4+G1))+F3*-((G4*-G1))+COUT0*(G4+-G1)) | COUT0=F3*((F1*F2)+CIN*(F1+F2))+F3*-((F1*-F2)+CIN*(F1+-F2)) | |
| 14 | ADDSUB-G-F1 | COUT1=F3*((G4*G1))+COUT0*(G4+G1))+F3*-((G4*-G1))+COUT0*(G4+-G1)) | COUT0=F1 | |
| 15 | ADDSUB-G-C1 | COUT1=F3*((G4*G1))+COUT0*(G4+G1))+F3*-((G4*-G1))+COUT0*(G4+-G1)) | COUT0=CIN | |
| 16 | ADDSUB-G-F3 | COUT1=F3*((G4*G1))+COUT0*(G4+G1))+F3*-((G4*-G1))+COUT0*(G4+-G1)) | COUT0=F3 | |
| 17 | INC-F-C1 | COUT1=F3*G4*G1+F3*-(G4+G1) | COUT0=COUT0 | |
| 18 | INC-FG-C1 | COUT1=COUT0*G4 | COUT0=CIN*F1 | |
| 19 | INC-G-1 | COUT1=G4 | COUT0=1 | |
| 20 | INC-G-F1 | COUT1=COUT0*G4 | COUT0=F1 | |
| 21 | INC-G-C1 | COUT1=COUT0*G4 | COUT0=CIN | |
| 22 | INC-G-F3 | COUT1=COUT0*G4 | COUT0=F3 | |
| 23 | INC-FG-1 | COUT1=F3*G4*G1+F3*-G4 | COUT0=COUT0 | |
| 24 | DEC-F-C1 | COUT1=COUT0+G4 | COUT0=F1+CIN*F1 | |
| 25 | DEC-FG-C1 | COUT1=COUT0+G4+COUT0*G4 | COUT0=F1+CIN*F1 | |
| 26 | DEC-G-0 | COUT1=G4 | COUT0=0 | |
| 27 | DEC-G-F1 | COUT1=G4+COUT0*F1*G4 | COUT0=F1 | |
| 28 | DEC-G-C1 | COUT1=G4+COUT0*G4 | COUT0=CIN | |
| 29 | DEC-G-F3 | COUT1=COUT0+G4=F3+G4 | COUT0=F3 | |
| 30 | DEC-FG-0 | COUT1=(COUT0*-G4)+G4=(F1*-G4)+G4 | COUT0=F1 | |
| 31 | INCDEC-F-C1 | COUT1=F3*(G4+COUT0)+F3*-G4*COUT0 | COUT0=0 | |
| 32 | INCDEC-FG-C1 | COUT1=-G4 | COUT0=F1 | |
| 33 | INCDEC-G-G0 | COUT1=F3*(G4+COUT0)+F3*-G4*COUT0 | COUT0=0 | |
| 34 | INCDEC-G-F1 | COUT1=-F3*(G4*COUT0)+F3*(G4+COUT0) | COUT0=F1 | |
| 35 | INCDEC-G-C1 | COUT1=-F3*(G4*COUT0)+F3*(G4+COUT0) | COUT0=CIN | |
| 36 | INCDEC-G-F1 | COUT1=-F3*((COUT0*-G4)+G4)+F3*(G4*COUT0) | COUT0=F1 | |
| 37 | FORCI-0 | COUT=0 | COUT0=0 | |
| 38 | FORCI-1 | COUT=1 | COUT0=1 | |
| 39 | FORCE-F1 | COUT1=COUT0=F1 | COUT0=F1 | |
| 40 | FORCE-C1 | COUT1=COUT0=CIN | COUT0=CIN | |
| 41 | FORCE-F3 | COUT1=COUT0=F3 | COUT0=F3 | |
| 42 | EXAMINE-C1 | COUT1=COUT0=CIN | COUT0=CIN | |

FIG. 4

Carry Logic Oscillator
(CLO)

FIG. 5B →

Carry Logic Oscillator (CLO)

Carry Pass Cell
(CARRYPAS)

Carry Out Cell
(CARRYOUT)

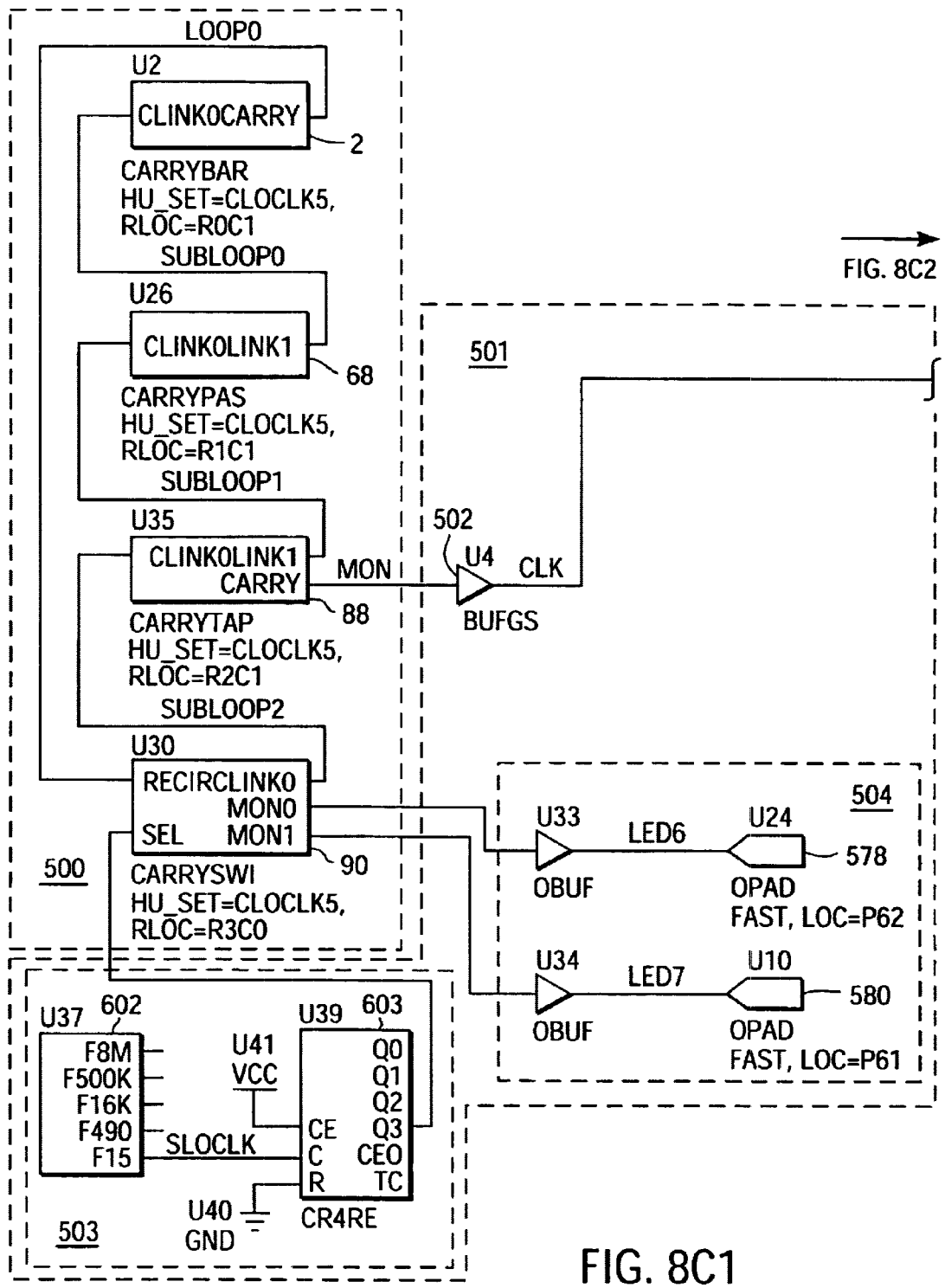
FIG. 8C1

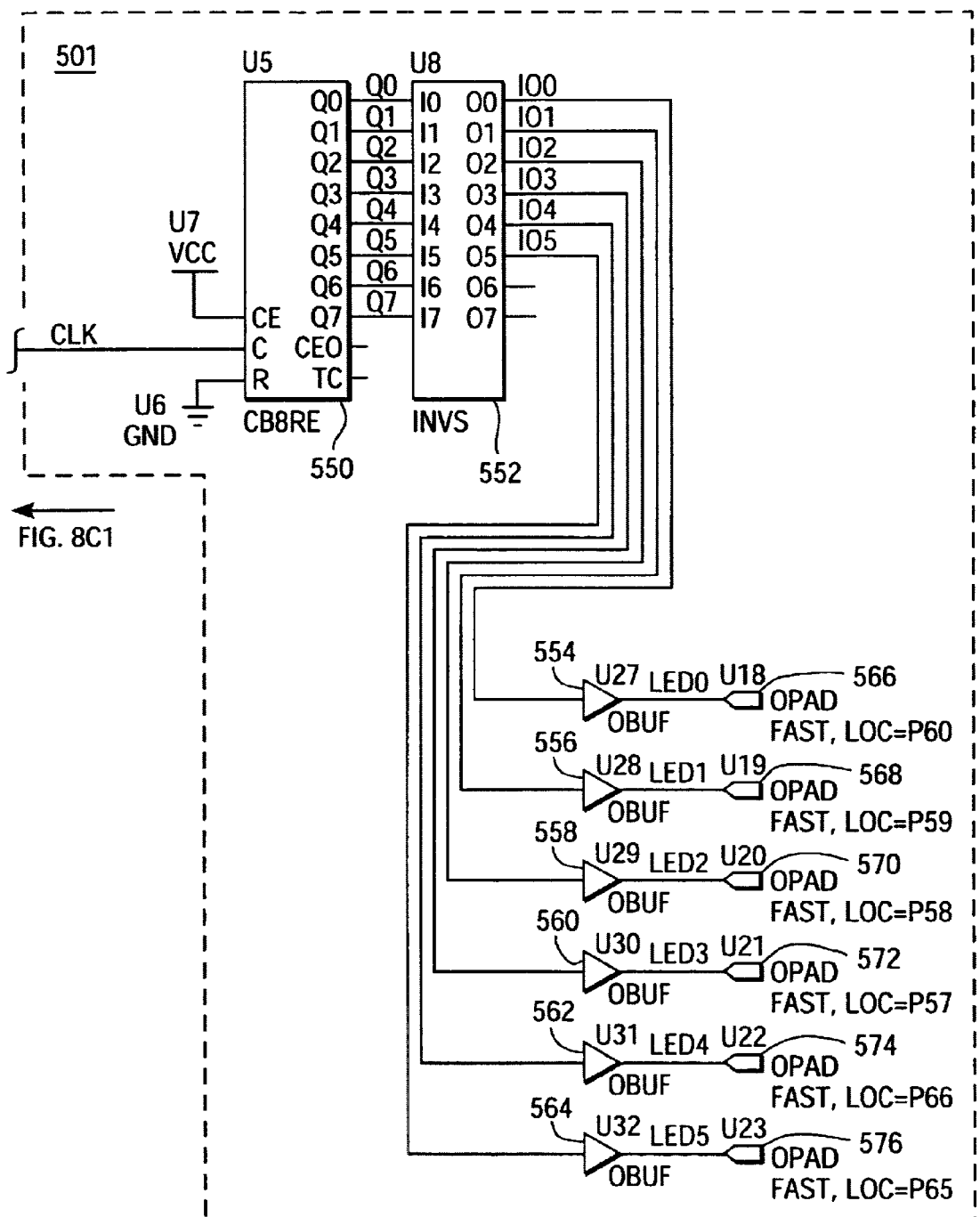
FIG. 8C2

METHOD AND APPARATUS FOR PHASE-LOCK IN A FIELD PROGRAMMABLE GATE ARRAY (FPGA)

FIELD OF THE INVENTION

The present invention relates generally to frequency synthesis schemes, and more particularly to a frequency synthesis scheme performed entirely inside a field programmable gate array (FPGA).

BACKGROUND OF THE INVENTION

Phase locked loops (PLLs) are used in various applications such as frequency synthesis, tone decoding, demodulation of AM and FM signals, pulse synchronization of signals from noisy sources (e.g., magnetic tapes), and regeneration of "clean" signals. A PLL typically includes the following components: a phase detector, low-pass filter, amplifier, and voltage-controlled oscillator (VCO). In frequency synthesis applications, a divide-by-n counter is added between the VCO output and the phase detector in the PLL loop. The phase detector compares two input frequencies: $f_{in}$ which is the frequency of an input or reference signal and $f_{VCO}$ which is the frequency of the signal generated by the VCO. If $f_{in}$ does not equal $f_{VCO}$, then the phase detector generates a phase-error signal which is then filtered by the low-pass filter and amplified by the amplifier. The phase-error signal is received by the VCO and causes the frequency of the VCO output signal to deviate to the value of $f_{in}$. It is further noted that the phase detector converts phase to voltage and that the VCO converts voltage to the time derivative of phase (i.e., frequency). When the $f_{VCO}$ value becomes equal to the fin value, the VCO will quickly "lock" to the $f_{in}$ value, thus maintaining a fixed phase relationship with the input signal.

In frequency synthesis applications, the PLL generates an output signal that is an integer multiple n of the input frequency $f_{in}$. The integer multiple n can be digitally adjusted, resulting in a flexible signal source that can be controlled by, for example, a computer.

In another field of technology, there exists programmable devices which are a class of general-purpose chips that can be configured for a wide variety of applications. One type of programmable device is commonly known as the field programmable gate array (FPGA). The interconnects between all the elements in an FPGA are designed to be user programmable.

Presently, there are four main types of FPGAs that are commercially available: symmetrical array, row-based, hierarchical PLD, and sea-of-gates. FPGAs provide the benefits of custom CMOS VLSI, while avoiding the initial cost, time delay, and inherent risks of a conventional masked gate array. FPGAs are customized by loading configuration data into the internal memory cells. An FPGA can either actively read its configuration data out of an external serial PROM or byte-parallel PROM (master mode), or the configuration data can be written into the FPGA (slave and peripheral mode). Where the FPGA is used in a Reconfigurable Computing Platform, particularly those using systems, methods, and/or apparatuses according to, e.g., U.S. Pat. Nos. 5,933,642, 5,854,918, 5,805,871, and 5,794,062, the FPGA device which performs computational operations is designed using a Hardware Description Language (HDL).

The FPGA design process is separate from the use of the FPGA as a computational element with stored programs, and typically results in a downloadable bitstream file (i.e., the circuit design) for dynamic configuration of the FPGA at runtime. Control over configuration at runtime in the FPGA is done with stored programs, which are separate binary data ("software") that are linked with bitstream data ("hardware"). These programs are generally sequences of instructions that have been compiled by a compiler for a High Level Language such as "C", with the inclusion of bitstream data for the FPGA primarily a linking step in the compilation. Through these particular methods, "hardware", i.e., the selection of an operational computer to execute programs, becomes a library for use by those programs. The FPGA is hence configured from within an application program at runtime. FPGAs can be programmed in an unlimited number of times and can support system clock rates of up to 300 megahertz with silicon technology of the year 2000.

The above-mentioned approaches do not disclose or suggest integrating a frequency synthesis scheme entirely inside an FPGA. Furthermore, the above-mentioned approaches do not disclose or suggest constructing an entire PLL in an FPGA.

SUMMARY OF THE INVENTION

The present invention broadly provides an apparatus and method for performing phase-lock in a field programmable gate array. In one embodiment of the invention, the apparatus includes a phase detector configured to determine a phase difference between a carry logic oscillator signal and a reference clock signal; and a combinational circuit coupled to the phase detector, and adapted to function as a variable carry logic oscillator, and further configured to generate the carry logic oscillator signal.

In another embodiment, the present invention provides an apparatus for performing phase-lock in a field programmable gate array, including a phase detector configured to determine a phase difference between a carry logic oscillator signal and a reference clock signal; and a carry logic oscillator coupled to the phase detector and configured to generate the carry logic oscillator signal. The carry logic oscillator includes a first column of carry logic cells and a second column of carry logic cells coupled together by a feedback loop for enabling quadrature phasing. The carry logic oscillator further includes a logic gate coupled to the first column and the second column, and the logic gate enables a frequency multiplication function.

The present invention further provides a method for performing phase-lock in a field programmable gate array. In one embodiment, the method includes: using a carry logic oscillator in a field programmable gate array to generate a carry logic oscillator signal; and determining a phase difference between the carry logic oscillator signal and a reference clock signal. The present invention makes possible the following advantages. The present invention can be directly implemented on-chip in an FPGA, without use of analog parts for synchronization, signaling, and transmission. Additionally, no special on-chip circuits are required for the present invention. Additionally, no external components (i.e., outside the FPGA) are required to implement the present invention.

BRIEF DESCRIPTION OF THE DRAWINGS

FIG. 4 is a table listing the carry logic block carry equations for the XC4000 FPGAs from Xilinx Incorporated;

FIG. 8C is a schematic block diagram of a digitally controlled Carry Logic Oscillator, and test logic, in accordance with an embodiment of the present invention.

DETAILED DESCRIPTION OF THE PREFERRED EMBODIMENTS

Those of ordinary skill in the art will realize that the following description of the preferred embodiments is illustrative only and not in any way limiting. Other embodiments of the invention will readily suggest themselves to those skilled in the art.

The internal structure of a field programmable gate array (FPGA) is dynamically reconfigurable through the use of a configuration data set or configuration bit-stream. An FPGA includes a set of Configurable Logic Blocks (CLBs), with each CLBs preferably including at least one function generator as well as one or more carry logic elements. Within any given CLB, particular logic functions are generated via the function generators in accordance with the configuration bit-stream. One suitable example of a CLB is the Xilinx XC4000 or XC4000E series CLB which includes an F-type function generator, a G-type function generator, and an H-type function generator. Each of the F-type generator and the G-type generator has a propagation delay of approximately 4.5 nanoseconds (ns), while the H-type function generator has a propagation delay of approximately 2.5 ns. The carry logic elements typically comprise carry-propagate logic designed to have very small, stable propagation delays (e.g., 1.5 ns).

Figure 1:
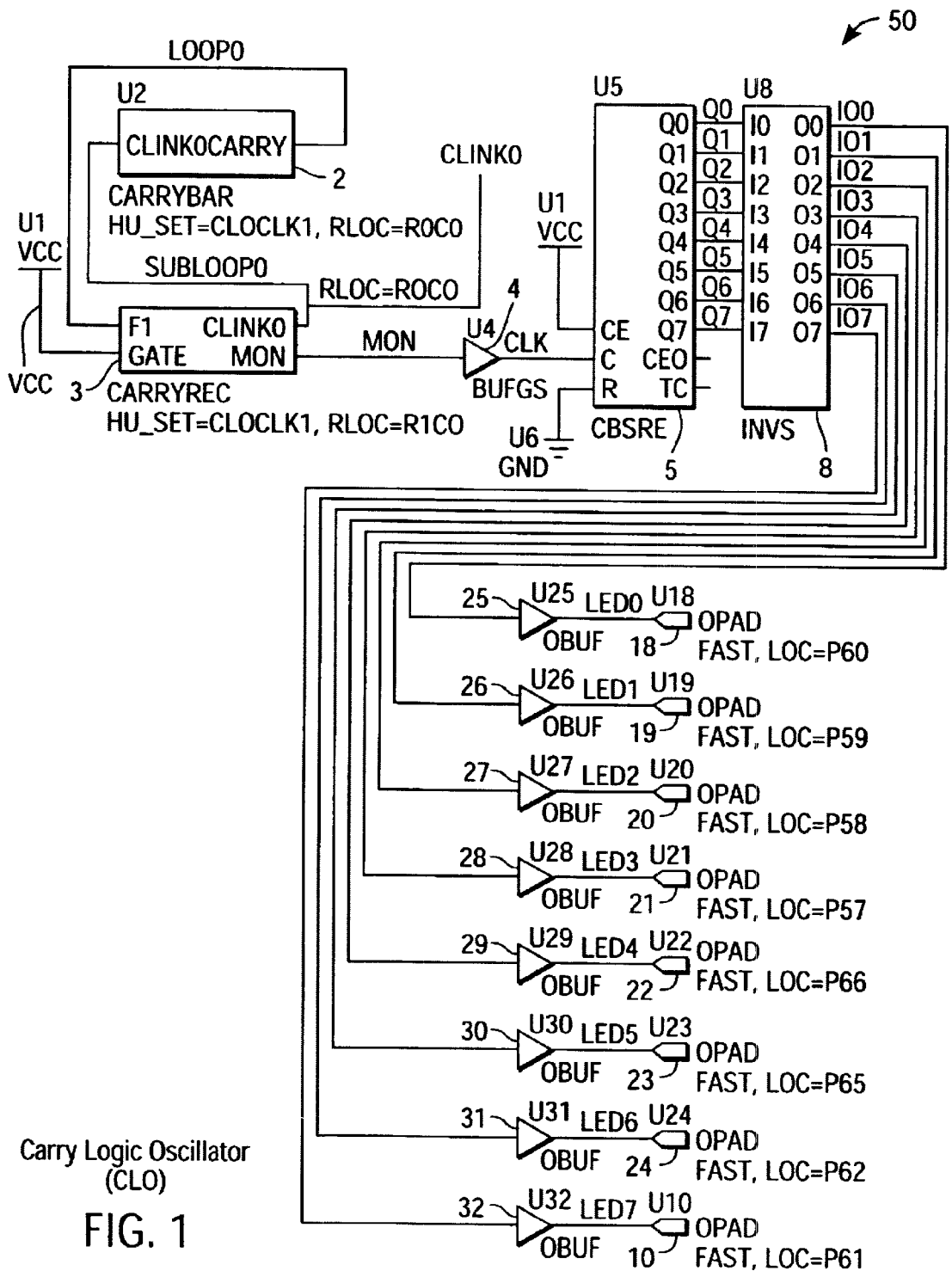
FIG. 1 is a schematic block diagram of a carry logic oscillator (CLO) in a test configuration and for providing functional oscillation.

FIG. 1 shows a block diagram of an embodiment of a carry logic oscillator (CLO) 50 which forms a portion of the phase locked loop (PLL) in accordance with the present invention. The carry logic oscillator 50 comprises a set of logic devices operationally coupled as shown in FIG. 1. In one embodiment, the carry logic oscillator 50 utilizes exemplary XC4000 or XC4000E FPGA devices from Xilinx, Inc. However, other types of logic devices may be used for the carry logic oscillator 50. The carry cell (CARRYBAR) 2 and carry cell (CARRYREC) 3 enable the oscillation function. The element (CB8RE) 5 is a simple binary counter which performs the function of monitoring the CLO oscillations after buffering through the global secondary buffer (BUFGS) 4. The element (INV8) 8 performs the function of inverting the binary count value of element (CB8RE) 5 for display on LEDs and at external connection terminals on a laboratory test board. The LEDs and external connection terminals are driven outside the FPGA device with elements (OPAD) 18–24 and 10. The carry logic oscillator 50 does not rely on elements 5, 8, 10, 18–24, and 25–32 for operation. These elements are merely for laboratory demonstration on test boards such as those manufactured by Xilinx, Inc. The modulation of the feedback signals in the CLO permits the CLO to function as the discrete-time equivalent of a voltage controlled oscillator. Thus, as will be explained below, the flexibility of FPGA technology can be effectively exploited to construct phase locked loops entirely in an FPGA.

The software enablement of the CLO 50 may be, for example, in an OrCAD schematic capture for DOS, and the Xilinx XACT tools. The technique employed for oscillation with Xilinx FPGA carry logic cells, as disclosed herein, is applicable to multiple FPGA product lines, including the present FPGA product lines. As previously stated above, the CLO 50 uses vertical arrays of, for example, Xilinx carry logic elements and Configurable Logic Block (CLB) cells such as blocks 2 and 3. The blocks 2 and 3 comprise partial use of exactly two (2) CLBs in, for example, Xilinx XC4000 FPGA logic. As shown in FIG. 1 in schematic form, the cells are arrayed in relative terms, using what is typically known as a "relational placement". The block 2 is on top and is shown as relational placement R0C0, which refers to placement in Row 0, Column 0. The block 3 is on the bottom and is shown as relational placement R1C0, which refers to placement in Row 1, Column 0. The block 2 is in the same column as the block 3, but the blocks 2 and 3 are one vertical row apart.

The net denoted as CLINK0 is a unidirectional carry logic "wire" placed in between the carry logic ports of Xilinx CLB cells with extremely fast propagation delay. The estimated wire delay plus internal carry logic delay is approximately 1.5 nano-seconds seconds for the 1993-era 5-speed grade XC4000 FPGAs. However, this is for two-bits worth of "carry generate" processing, which in one embodiment this invention is using to effect timing. In the later figures in this disclosure, where frequency control is engaged in the CLO, it is novel that selective feedback can be employed within a single CLB to effect a choice of delay time as small as approximately 750 pico-seconds. This is possible using previous Xilinx FPGA hardware. The advantage accrues to more modern FPGAs insofar as the carry logic delays are greatly reduced, affording very much more fine precision CLO frequency tuning.

It is novel that the bulk of the total loop delay can be accurately controlled to approximately 5% (based on Applicant's previous laboratory bench testing with hot/cold testing in ambient air) using only one feedback wire that uses generalized routing resources in the FPGA. In FIG. 1, this feedback wire is the net between blocks 2 and 3 and is denoted as LOOP0, which should be separately identified as distinct from the carry logic net CLINK0. The delay time of the net LOOP0 is a moderate fraction of the cumulative CLB delay times. The delay time of the carry logic net CLINK0 is a small fraction of the cumulative CLB delay times. Thus, it is a novel feature of this invention that relatively stable delays of CLBs provide the largest cumulative timebase, and that variances in loop oscillation from the necessary metal wires and CMOS pass transistors involved in linking the CLBs are much less than the main variation of the CLBs alone. It is also a novel feature of this invention that the CLO technique provides an oscillator configuration that is more stable than the configuration clock oscillator provided in the FPGA for bitstream loading, since the configuration clock oscillator typically has 20% or more frequency variation over temperature and voltage. The CLO 50 in FIG. 1 is functionally operable because it fulfills the Barkhausen Criterion for oscillation: (1) a cumulative phase shift around the loop of 360 degrees at the frequency of oscillation, and (2) a power gain of at least one (1).

Several circuit configurations had to be investigated by Applicant in order to apply the fundamental system principle of the invention to FPGA devices. It is novel that there is sufficient gain to provide for CLO oscillation only when the frequency tap occurs at a CLB output (i.e., output of block 3 of FIG. 1), and not in any of the recirculating feedback elements (nets CLINK0 and LOOP0). Tapping the nets CLINK0 or LOOP0 to obtain a frequency output appears to cause criteria (2) of the Barkhausen Criterion to not be met, thus not allowing oscillation to occur. Tying the frequency sampling tap to a global buffer is useful for exploiting the produced frequency by the CLO 50. However, it is a novel feature of the invention that the general-purpose FPGA routing resources involved to link the CLO 50 to the global buffer 5 do not materially affect the frequency produced by the CLO 50.

It is further noted that in commonly-assigned U.S. Pat. No. 5,854,918, which is fully incorporated herein by reference, the carry logic oscillator (CLO) operates in a gate-controlled manner. The CLO is turned on synchronously with respect to an external synchronous clock, but self-terminates at .a predictable ending time in relation to the external clock. In contrast, the present invention is different because it deals with an FPGA mechanism for frequency control of the CLO, and not merely gating of the CLO. Also, the present invention is different, because it is a narrow lock range phase locked loop (PLL) created from the conventional internal resources of an FPGA. The present invention will work with, for example, any Xilinx FPGAs having carry logic cells, including Virtex FPGAs.

Figure 2:
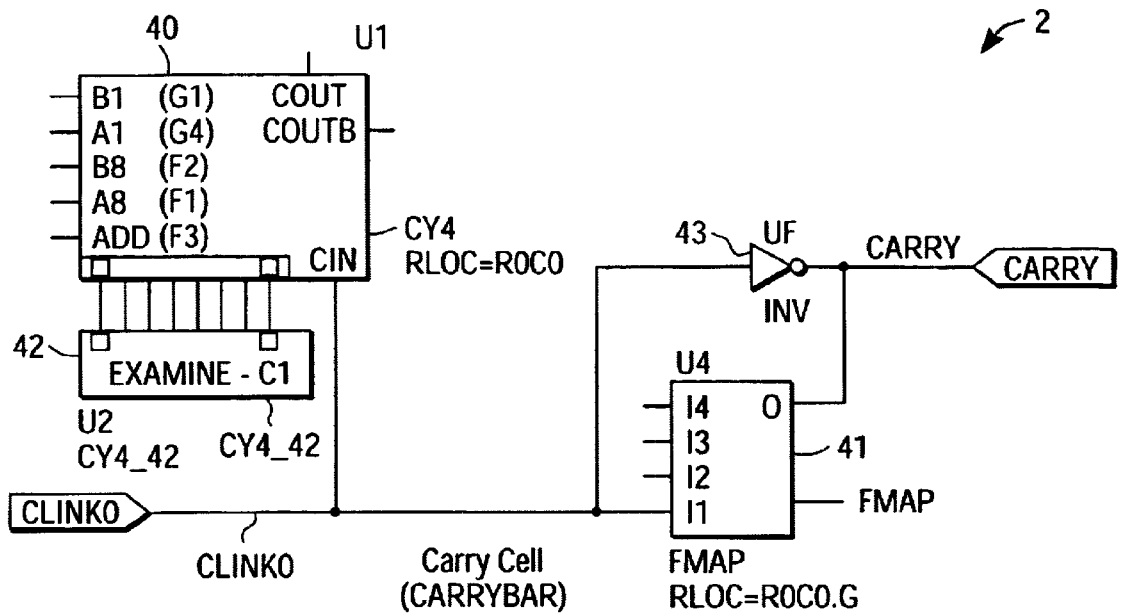
FIG. 2 is a schematic block diagram of a carry logic cell (CARRYBAR) in the CLO in FIG. 1.
Figure 3:
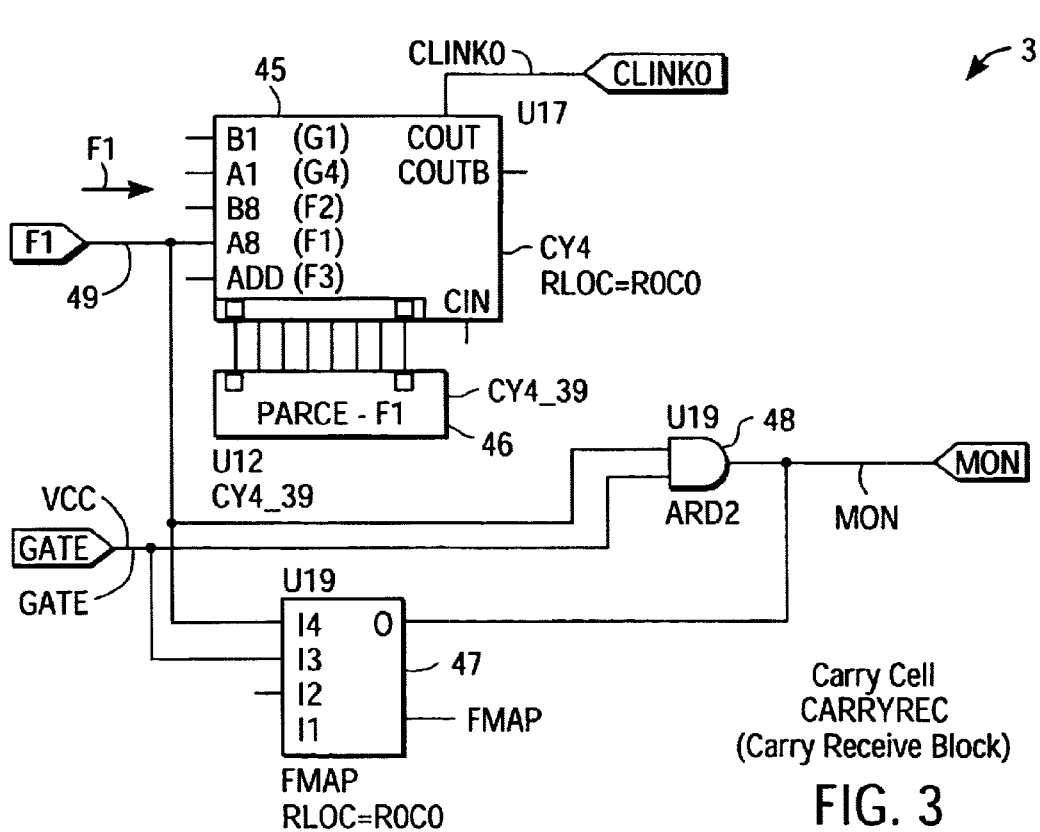
FIG. 3 is a schematic block diagram of the "Carry Receive" carry logic cell in the CLO in FIG. 1.

Reference is now made to FIGS. 2 to 4 for purposes of describing the operation of the carry logic cells 2 and 3. FIG. 2 shows the details of the carry cell (CARRYBAR) 2, while FIG. 3 shows the details of the carry cell (CARRYREC) 3. The organization and coupling of these. CLO building blocks will now be explained for use in a fixed-frequency CLO, such as that depicted in FIG. 1. Referring first to FIG. 2, there is shown the logical inversion and carry logic cell configuration for allowing the G function generator of a CLB to propagate the carry input to the CLB output. The carry logic cell (CARRYBAR) 2 is wholly contained within one CLB, and includes four elements, such as carry logic element (CY4) 40, (FMAP) element 41, configuration element (CY4_42) 42, and inverter 43. The physical carry logic circuitry known as a CY4 block in Xilinx XC4000/E FPGAs is, for example, contained in carry logic element (CY4) 40. This circuitry is normally used to augment carry generate addition, subtraction, incrementation, and decrementation, among other functions, but it is not used that way to construct the carry logic oscillators (CLOs) in the present invention. The function that the carry logic element (CY4) 40 should perform is controlled by configuration element (CY4_42) 42, which is, for example, a Xilinx CY4_42 block. The configuration element (CY4_42) 42 drives the carry logic element 40 in the "EXAMINE-C1" mode which is also referenced in row 42 in the table of FIG. 4. The other available operating mode options for configuration element (CY4_42) 42 are listed in the table in FIG. 4 for reference. As shown in the column denoted by "Internal CLB Carry Equation", the EXAMINE-C1 mode applies the equation COUT0=CIN for the function of carry logic element (CY4) 40. Thus, the CLB will output the signal received at terminal CIN (via line CLINK0).

The configuration element (CY4_42) 42 impacts not only carry logic element (CY4) 40, but also how (CY4) element 40 links with the G-function generator in the CLB, depicted in FIG. 2 as (FMAP) element 41 and inverter 43. The combination of (CY4) element 40 and (CY4_42) element 42 is controlled by a very small portion of the Xilinx bitstream for an FPGA configuration. These form in essence an integral unit, in signal exchanges with the (FMAP) element 41, which is mated with inverter 43. The (FMAP) element 41 serves to associate inverter 43 with the G-function generator of the CLB using a relational placement directive "R0C0" which also associates the G-function generator with the (CY4) element 40 and configuration element (CY4_42) 42 within the same CLB.

These relational placements cause the elements 40, 41, 42, Hand 43 to function together integrally to accept an input signal on carry logic metal line CLINK0 and invert this signal with the inverter 43 contained in the G-function generator, to the source net "CARRY" at the CLB output. Thus, carry logic cell (CARRYBAR) 2 in FIGS. 1 and 2 functions to convert signals carried on special-purpose carry metal lines within the FPGA to conventional general interconnect lines, by passing through the G-function generator of a CLB. The signal flow is from net CLINK0 to net CARRY, with a logical inversion.

It is noted that the CLB in FIG. 2 provides 180 degrees of phase shift for oscillation. It should also be noted that this circuit does not use the F function generator or H function generator at all, nor does the circuit use the CLB flip-flops. This logic is available for any computational purpose whatsoever without disturbing the loop.

The ability to pack computational logic within the FPGA resources used for the CLB infers another novel feature of the invention. Separate timing for local flip-flops is facilitated by using the carry link within the CLB at (CY4) element 40 as a source of timing. Configuration element (CY4_42) 42 could be programmed with an alternative arrangement that also preserves the functionality necessary to invert the examined carry, and propagate it out through a CLB function generator programmed for logical inversion.

This localized timing will be offset from similar timing in other CLBs in a vertical column of logic packed within CLO cells. This feature can be used to improve the absolute maximum AC operational speeds available from the FPGA, improving net computational performance approximately 15–20% above data sheet limits. This is possible because the mode of circuit operation is one in which all of the interconnects are strictly localized, and this results in a more highly optimized signal flow than in the usual (or conventional) practice. For instance, multibit counters with maximum frequencies approaching the toggle-rate limit of the individual flip-flops can be produced with this technique.

The CLO is an invention which benefits from scrutinizing the local spacetime surrounding each CLB with a much smaller than traditional event horizon, and then doing this analysis concurrently for all of the CLBs for a specific circuit application.

FIG. 3 illustrates the carry logic cell (CARRYREC) 3 which provides coupling of the inverted feedback from carry logic cell (CARRYBAR) 2 (FIG. 2), for both loop oscillation and for output purposes. The carry logic cell (CARRYBAR) 3 is called the "Carry Receive" Block. The carry logic cell (CARRYREC) 3 is wholly contained within one CLB, and includes four elements, such as carry logic element (CY4) 45, configuration element (CY4_39) 46, (FMAP) element 47, and AND gate 48. The function that carry logic element (CY4) 45 should perform is controlled by configuration element (CY4_39) 46, which is, for example, a Xilinx CY4_39 block. The configuration element (CY4_39) 46 drives the carry logic element (CY4) 45 in the "FORCE-F1" mode which is also referenced in row 39 in the table of FIG. 4. The (CY4_39) element 46 impacts not only (CY4) element 45, but also how (CY4) element 45 links with either the F-function or G-function generators in the CLB. The function generator is depicted in FIG. 3 as (FMAP) element 47 and AND gate. 48. The combination of carry logic element (CY4) 45 and configuration element (CY4_39) 46 forms an integral unit in signal exchanges with the (FMAP) element 47, which is mated with AND gate 48. The (FMAP) element 47 serves to associate AND gate 48 with the either F-function or G-function generator of the CLB using a relational placement directive "R0C0". This also associates the function generator with the (CY4) element 45 and configuration element (CY4_39) 46 within the same CLB. The alternative input GATE to the AND gate 48 may be tied to VCC (as shown in FIG. 1) or in an alternative embodiment, used as a control line to synchronously gate the CLO operation. Such an alternative embodiment is exemplified as described in element 34 of U.S. Pat. No. 5,854,918.

As stated above, in one embodiment the AND gate 48 has an input tied to the voltage source VCC. The VCC is supplied from a Logic-High from a source located in any other position in the FPGA. This was originally a start-stop gating input. The AND gate 48 is implemented if gating control is needed. The AND gate 48 serves as a logical linkage of the feedback path ("pass through"), while also providing the power gain necessary to keep the loop operational as an oscillator.

The localized relational placements of the elements 45, 46, 47, and 48 function together integrally within one CLB to accept an input signal F1 on a general-purpose interconnect line 49, and pass this signal through for transmission to two lines simultaneously, with the two lines being CLINK0 and MON. This signaling is handled by (CY4) 45, as controlled by (CY4_39) element 46, plus AND gate 48 simultaneously. Net CLINK0 is a special-purpose carry metal line, designed to link to a nearest neighbor CLB in a vertical column, such as CLINK0 for the carry logic cell (CARRYBAR) 2. Concurrently, net MON is used to "monitor" the net 49 to net CLINK0 signal exchange for purposes of extracting that signal for use as a clock for broader distribution within the FPGA. As shown in the column denoted by "Internal CLB Carry Equation" in FIG. 4, the FORCE-F1 mode applies the equation COUT0=F1 for the function of block 45. Thus, the carry logic cell (CARRYREC) 3 will output the signal received at terminal F1 (via net LOOP0 in FIG. 1).

Referring again to FIG. 1, the basic mechanism of oscillation in the CLO can now be explained in terms of the couplings of carry logic cell (CARRYREC) 3 from FIG. 3, and carry logic cell (CARRYBAR) 2 from FIG. 2. The net CLINK0 in FIG. 1 exchanges signals between the CLINK0 terminal of carry logic cell (CARRYREC) 3, an output terminal, and the CLINK0 terminal of carry logic cell (CARRYBAR) 2, an input terminal. Net LOOP0 in FIG. 1 exchanges signals between the CARRY terminal of carry logic cell (CARRYBAR) 2, an output terminal, and the F1 terminal of carry logic cell (CARRYREC) 3, an input terminal. The nets CLINK0 and LOOP0 form a recirculating loop. The CLO in FIG. 1 works because it fulfills the Barkhausen Criterion for Oscillation: (1) a cumulative phase shift around the loop of 360 degrees at the frequency of oscillation, and (2) a power gain of at least 1.

Figure 5A:
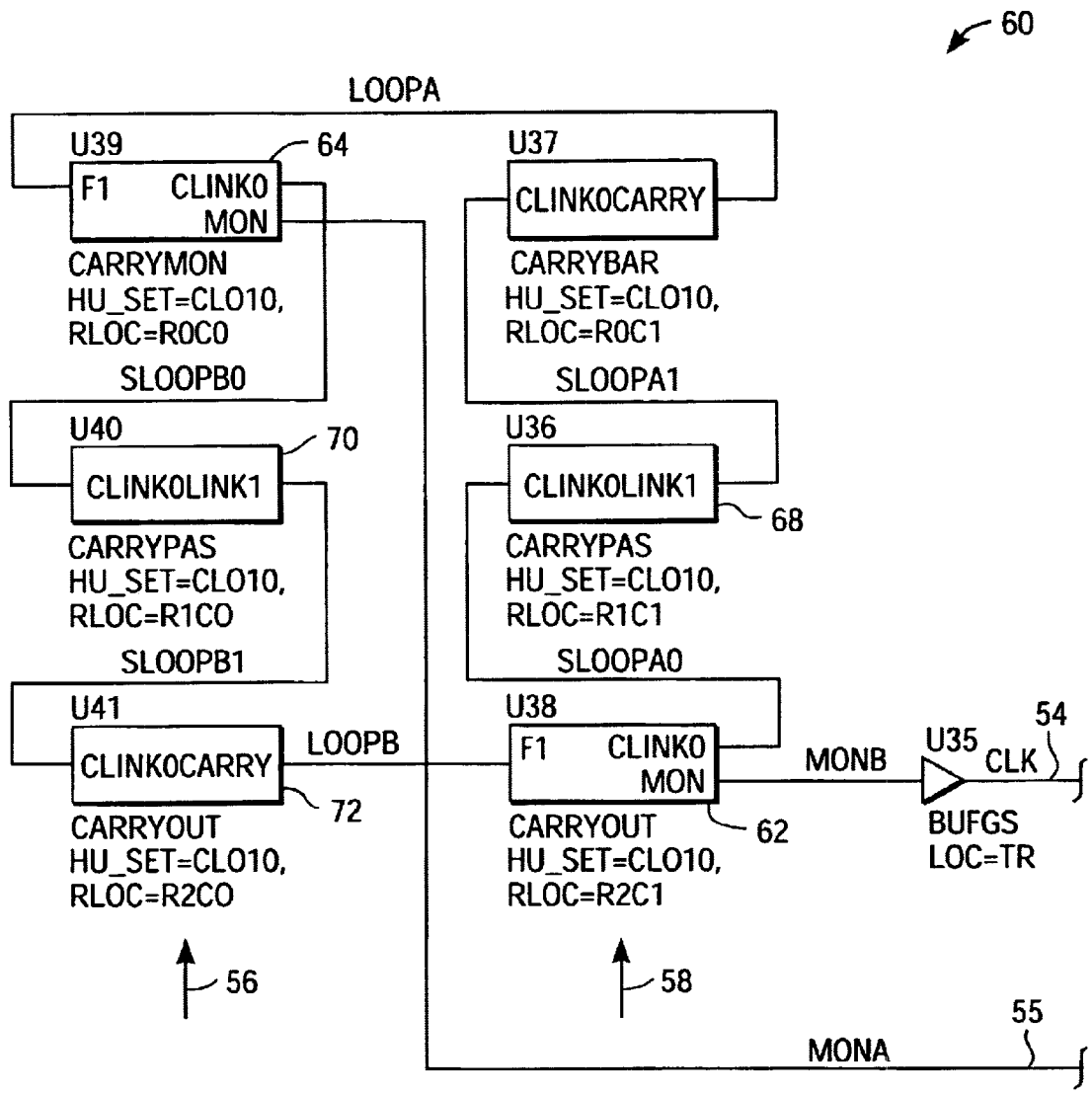
FIG. 5 is a schematic block diagram of another embodiment of a carry logic oscillator in accordance with the present invention, with the carry logic oscillator including a feedback loop extending across two adjacent vertical columns of relationally placed carry logic blocks.
Figure 5B:
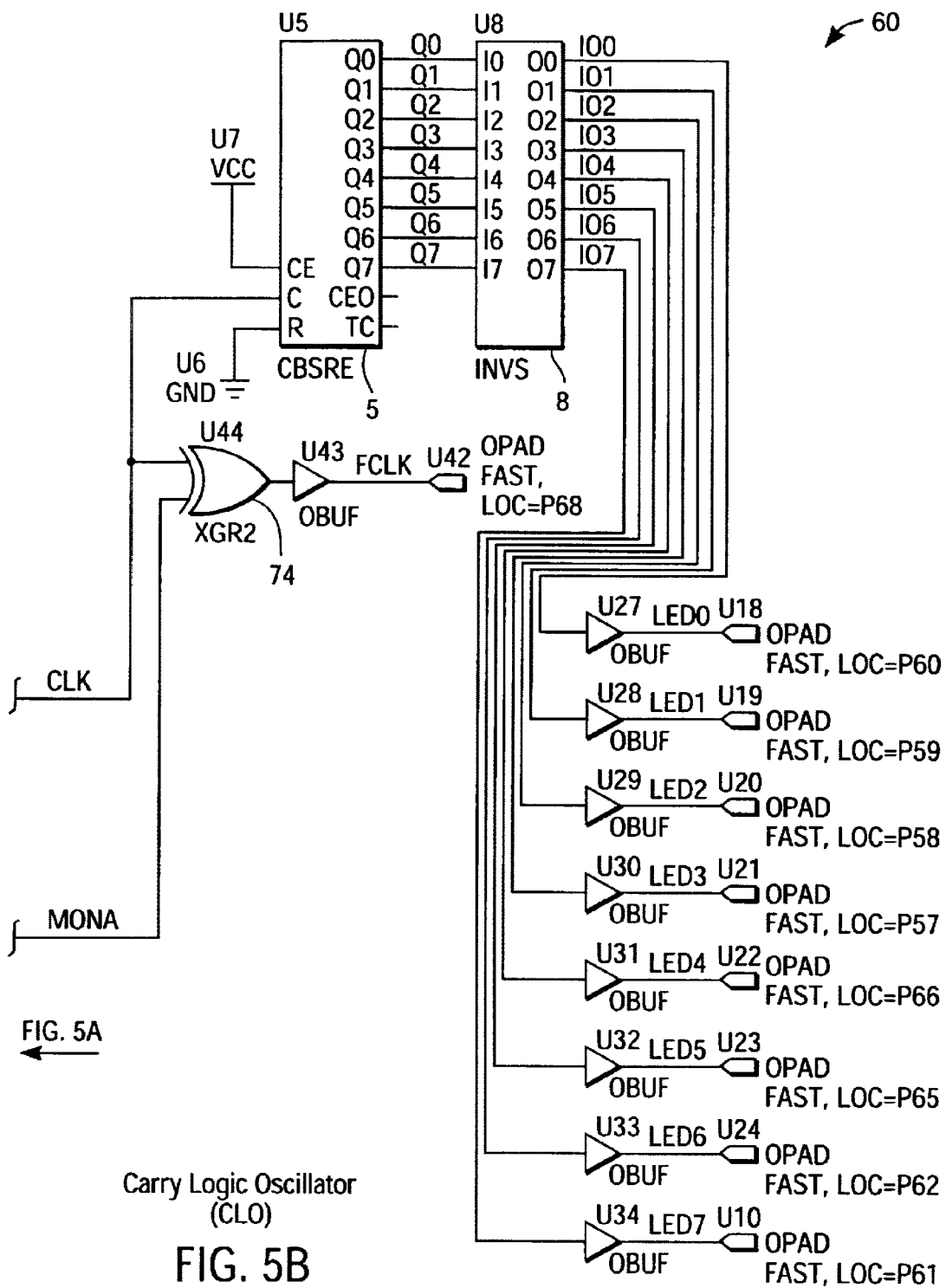

FIG. 5 illustrates another embodiment of the carry logic oscillator 60 in accordance with the present invention. The carry logic oscillator 60 comprises a set of logic devices operationally coupled as shown in FIG. 5. This particular embodiment permits quadrature phasing and frequency multiplication, as described below. The carry logic oscillator 60 includes a feedback loop, shown as net LOOPA, which extends across two adjacent vertical columns 56 and 58 of relationally placed CLBs and inherent carry logic cells.

This embodiment introduces three new types of cells. The first is a tapping type of cell called "Carry Monitor" (CARRYMON) such as block 62 (or block 64). The Carry Monitor cell 62 is shown in detail in FIG. 6. The cell 62 allows a buffered tap of the carry line CLINK0 to pass through the carry logic element (in the CLB of cell 62), hence not perturbing the carry line passed to a vertically adjacent cell.

The second type of cell in FIG. 5 is the "Carry Pass" (CARRYPAS) cell 68 (or cell 70). Cell 68 is shown in detail in FIG. 7B. The cell 68 does the work of a Carry Monitor cell, without a monitor. The function of the carry pass cell 68 is to lower the effective loop frequency by adding slightly more cumulative loop delay time. In the Xilinx XC4000 FPGAs used for enablement of one embodiment of the present invention, this was approximately 1500 picoseconds.

The third type of cell in FIG. 5 is the "Carry Out" (CARRYOUT) cell 72. Cell 72 is shown in detail in FIG. 8A. The function of the cell 72 is to accept a carry input from previous loop circuits, and to propagate the carry loop further, in this case between any two arbitrary relationally placed vertical columns such as vertical columns 56 and 58.

A novel feature of using two linked columns (e.g., as columns 56 and 58 in FIG. 5) is the ability to create quadrature timed waveforms, which is useful for some signal processing algorithms which need FPGA logic to work at the baseband signaling rate. As in the previously described CLO apparatus of FIG. 1, computational logic can be profitably embedded within the lightly used CLB cells comprising the invention.

The phased-array of recirculating pulses in the CLO 60 of FIG. 5 enables frequency multiplication. This enablement is illustrated with the XOR gate 74 shown. The taps (coupled via nets 54 and 55) were arranged to allow the XOR gate 74 to regenerate a phased clock signal that is equal to the frequency supplied to the experimental monitoring counter (not shown).

Figure 6:
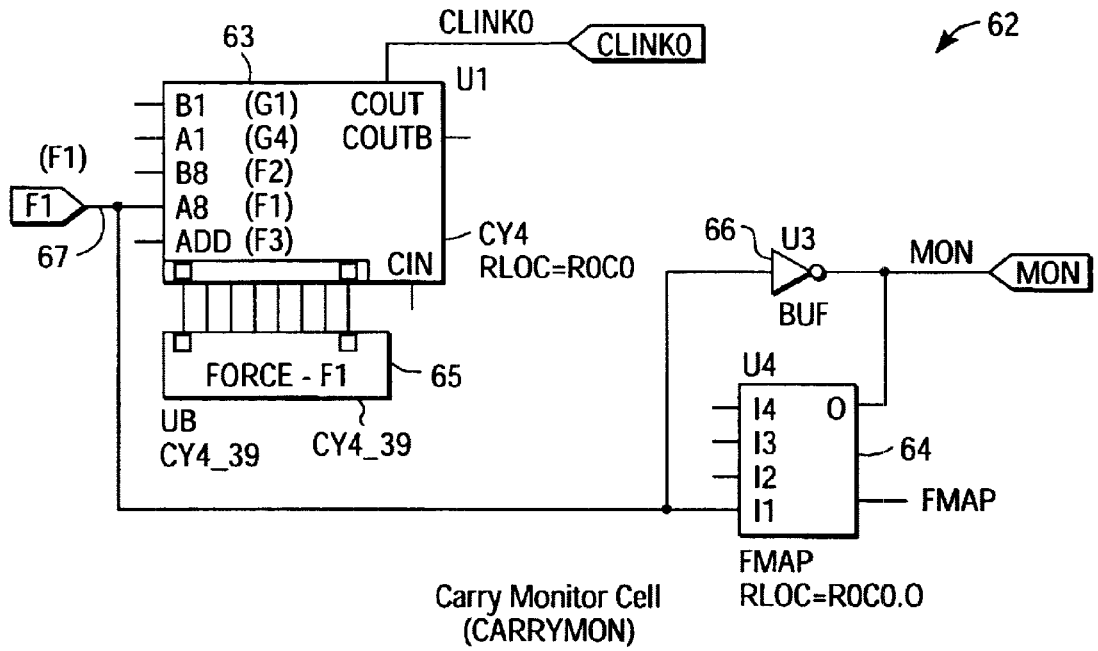
FIG. 6 is a schematic block diagram of the tapping-type carry logic cell in FIG. 5.

FIGS. 6, 7 B, and 8 A illustrate the details of the carry logic elements (CARRYMON) 62, (CARRYPAS) 68, and (CARRYOUT) 72, respectively, of FIG. 5. These elements permit CLO oscillation to be controlled dynamically, and to effect discrete steps in frequency change.

Referring to FIG. 6, the carry logic cell (CARRYMON) 62 is wholly contained within one CLB, and includes four elements, such as carry logic element (CY4) 63, (FMAP) element 64, configuration element (CY_39) 65, and buffer 66. The physical carry logic circuitry known as a CY4 block in Xilinx XC4000/E FPGAs is, for example, contained in carry logic element (CY4) 63. This circuitry is normally used to augment carry generate addition, subtraction, incrementation, and/or decrementation, among other functions, but it is not used that way to construct carry logic oscillators (CLOs) in the present invention. The function that carry logic element (CY4) 63 should perform is controlled by configuration element (CY4_39) 65, which is, for example, a Xilinx CY4_39 block. The configuration element (CY4_39) 65 drives the carry logic element 63 in the "FORCE-F1" mode which is also referenced in row 39 in the table of FIG. 4. The configuration element (CY4_39) 65 impacts not only carry logic element (CY4) 63, but also how (CY4) element 63 links with the G-function generator in the CLB, depicted in FIG. 6 as (FMAP) element 64 and buffer 66. The combination of (CY4) element 63 and (CY4_39) element 65 is controlled by a very small portion of the Xilinx bitstream for an FPGA configuration. These form in essence an integral unit, in signal exchanges with the (FMAP) element 64, which is mated with buffer 66. The (FMAP) element 64 serves to associate buffer 66 with the G-function generator of the CLB using a relational placement directive "R0C0" which also associates the G-function generator with the (CY4) element 63 and configuration element (CY4_39) 65 within the same CLB.

These relational placements cause the elements 63, 64, 65, and 66 to function together integrally to accept an input signal on carry logic metal line 67 (which is coupled to terminal F1 of carry logic cell 62) and transfer this signal with the buffer 66 contained in the G-function generator, to net "MON" at the CLB output. Thus, carry logic cell (CARRYMON) 62 (in FIGS. 5 and 6) functions to convert signals carried on special-purpose carry metal lines within the FPGA to conventional general interconnect lines, by passing through the G-function generator of a CLB. The signal flow is from net 67 to net MON.

Figure 7A:
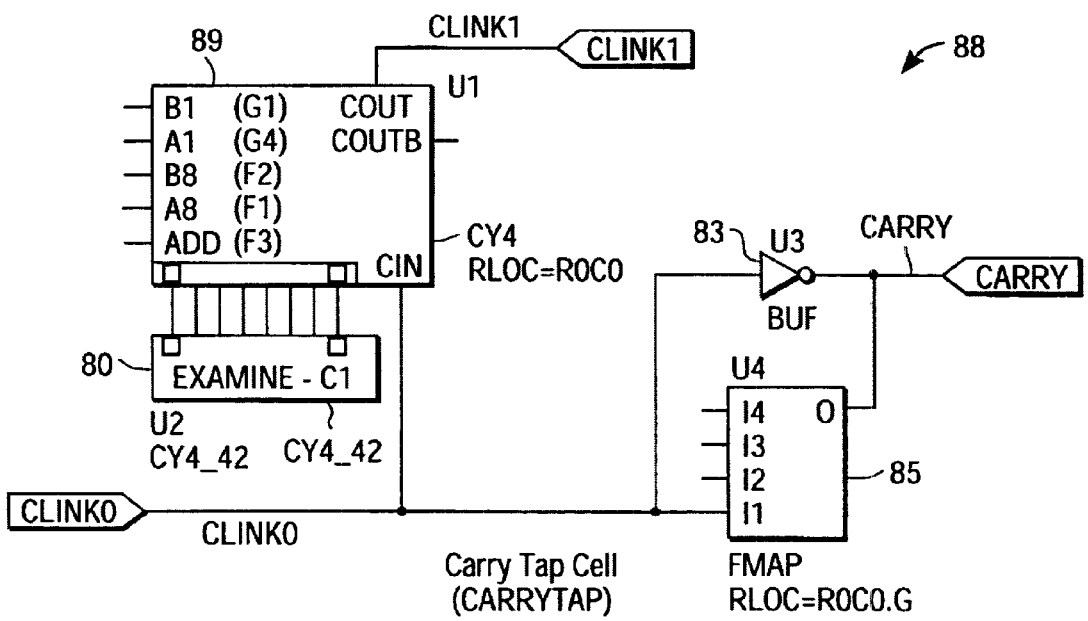
FIG. 7A is a schematic block diagram of the "Carry Tap" carry logic cell in FIG. 8C.
Figure 7B:
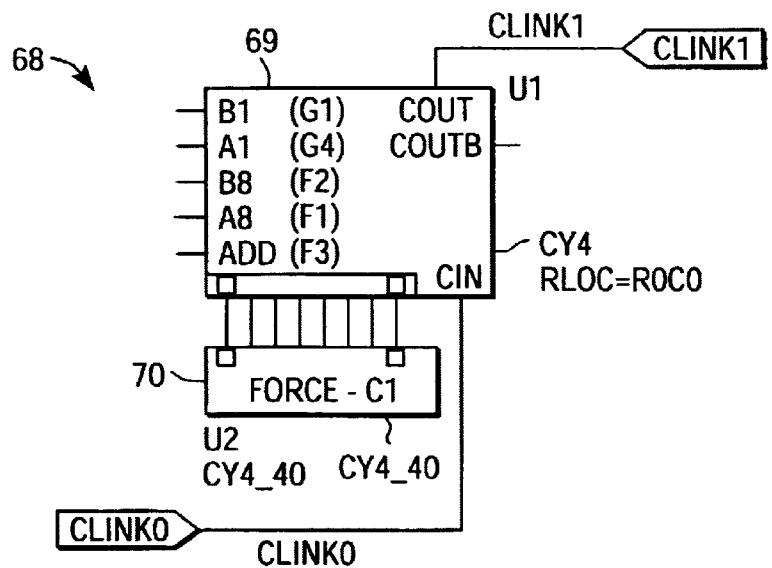
FIG. 7B is a schematic block diagram of the "Carry Pass" carry logic cell in FIG. 5.

Referring now to FIG. 7B, the carry logic cell (CARRYPAS) 68 is wholly contained within one CLB, and includes two elements, such as carry logic element (CY4) 69 and configuration element (CY_40) 70. The function that carry logic element (CY4) 69 should perform is controlled by configuration element (CY4_40) 70, which is, for example, a Xilinx CY4_40 block. The configuration element (CY4_40) 70 drives the carry logic element 69 in the "FORCE-C1" mode which is also referenced in row 40 in the table of FIG. 4. The combination of (CY4) element 69 and (CY4_40) element 70 is controlled by a very small portion of the Xilinx bitstream for an FPGA configuration. These relational placements cause the elements 69 and 70 to function together integrally to accept an input signal on carry logic metal line CLINK0 and pass this input signal to net CLINK1.

Figure 8A:
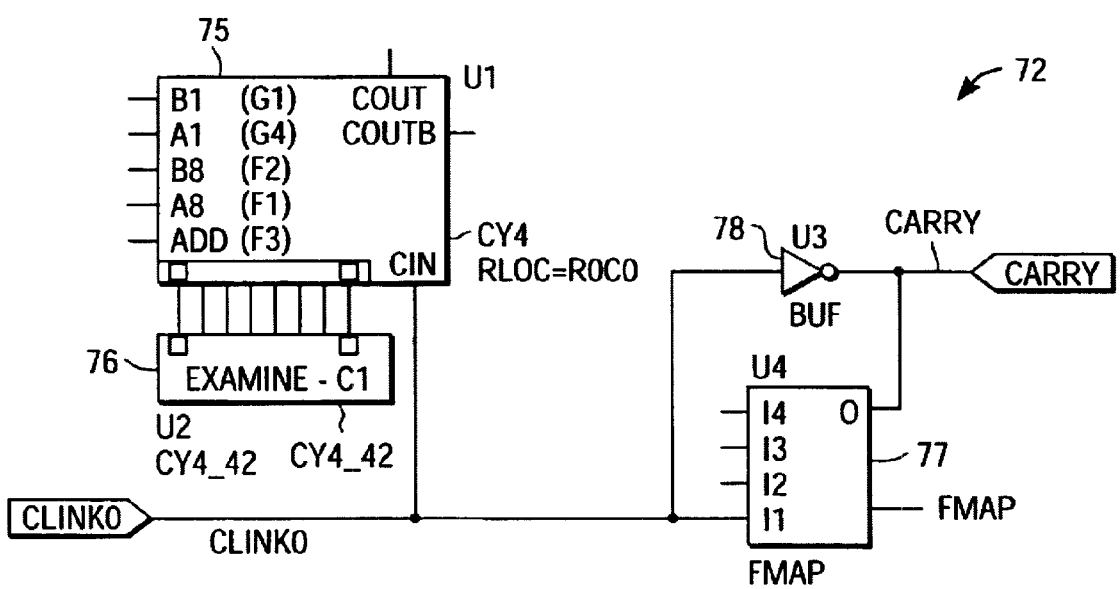
FIG. 8A is a schematic block diagram of the "Carry Out" carry logic cell in FIG. 5.

Referring now to FIG. 8A, the carry logic cell (CARRYOUT) 72 is wholly contained within one CLB, and includes four elements, such as carry logic element (CY4) 75, configuration element (CY4_42) 76, (FMAP) element 77, and buffer 78. The physical carry logic circuitry known as a CY4 block in Xilinx XC4000/E FPGAs is, for example, contained in carry logic element (CY4) 75. This circuitry is normally used to augment carry generate addition, subtraction, incrementation, and decrementation, among other functions, but it is not used that way to construct carry logic oscillators (CLOs) in the present invention. The function that carry logic element (CY4) 75 should perform is controlled by configuration element (CY4_42) 76, which is, for example, a Xilinx CY4_42 block. The configuration element (CY4_42) 76 drives the carry logic element 75 in the "EXAMINE-C1" mode which is also referenced in row 42 in the table of FIG. 4. The configuration element (CY4_42) 76 impacts not only carry logic element (CY4) 75, but also how the (CY4) element 75 links with the G-function generator in the CLB, depicted in FIG. 8A as (FMAP) element 77 and buffer 78. The combination of (CY4) element 75 and (CY4_42) element 76 is controlled by a very small portion of the Xilinx bitstream for an FPGA configuration. These form in essence an integral unit, in signal exchanges with the (FMAP) element 77, which is mated with buffer 78. The (FMAP) element 77 serves to associate buffer 78 with the G-function generator of the CLB using a relational placement directive "R0C0" which also associates the G-function generator with the (CY4) element 75 and configuration element (CY4_42) 76 within the same CLB.

These relational placements cause the elements 75, 76, 77, and 78 to function together integrally to accept an input signal on carry logic metal line CLINK0 and transfer this signal with the buffer 78 contained in the G-function generator, to source net "CARRY" at the CLB output. Thus, carry logic cell (CARRYOUT) 72 in FIGS. 5 and 8A functions to convert signals carried on special-purpose carry metal lines within the FPGA to conventional general interconnect lines, by passing through the G-function generator of a CLB. The signal flow is from net CLINK0 to net CARRY.

Figure 8B:
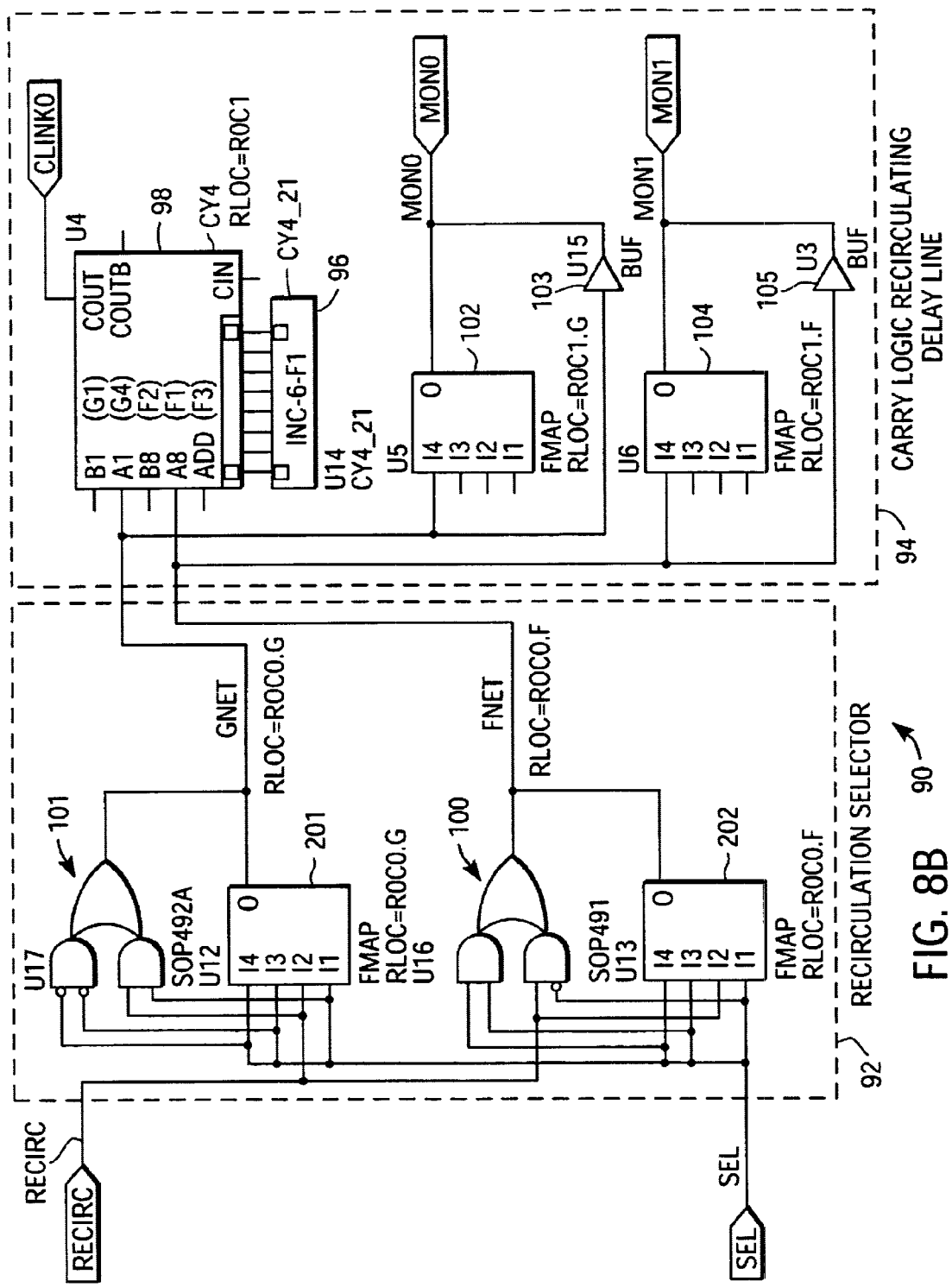
FIG. 8B is a schematic block diagram of a combinational circuit for enabling a variable carry logic oscillator in accordance with an embodiment of the present invention.

FIG. 8B is a block diagram of a controlled CLO apparatus 90 in accordance with another embodiment of the present invention. The CLO apparatus 90 comprises a set of logic devices operationally coupled as shown in FIG. 8B. The block 94 in FIG. 8B functions in a similar manner as previously described for the above CLO apparatus. However, the block 92 (i.e., the cell below block 94) redirects the inverted feedback loop line in two different paths. The logic shown for this cell, located relationally at R0C0, gates one carry off, and the other to recirculate, as seen by the logic in block 94, located relationally at R0C1. This on/recirculate situation happens in two different ways. A novel aspect of this is the programming of the carry logic mode to INC-G-F1 (see (CY4_21) block 96), for the CY4 block 98 at R0C1 in block 94. This INC-G-F1 mode (see also row 20 in FIG. 4) was specifically selected so that block 92 would generate correct logic states to maintain oscillator action in either of two states.

The combination of blocks 92 and 94, in creating the CLOs described previously, is to allow oscillator action to be controlled with approximately +/−750 pico-seconds delay variance, in XC4000 FPGAs, yet do so with FPGAs ostensibly having much larger delay times than this controllable amount of time.

This is the base and novel circuit technique which allows or enables a variable CLO, which is the building block necessary for an FPGA-internal PLL. This technique is cascadable to more sections, allowing additional incremental changes to overall loop recirculation time, and hence frequency.

The mechanism of controlling incremental changes can be understood with reference to block (U16) 100, block (U17) 101 and block (U4) 98 in FIG. 8B. Line GNET emerges from the output of block (U17) 101, and line FNET emerges from the output of block (U16) 100. The line RECIRC is the recirculation path for feedback from the last carry out stage in the carry logic oscillator. The SEL line is used as the control line for redirecting the RECIRC line through the carry logic element (U4) 98, which comprises in this application a two-stage tapped delay line of a very small time interval. The line CLINK0 of element 98 (U4) in FIG. 8B functions analogously with the CLINK0 line of element 45 (FIG. 3). Only in this case, the carry logic feedback is being directed to one of two pathways having slightly different delays, as will be explained in the following function table (TABLE 1).

TABLE 1

FUNCTION TABLE FOR RECIRCULATING SELECTOR AND CARRY LOGIC

| SEL | RECIRC | GNET | FNET | COUT0 | COUT (CLINK) |
|---|---|---|---|---|---|
| 0 | 0 | 1 | 0 | 0 | 0 |
| 0 | 1 | 1 | 1 | 1 | 1 |
| 1 | 0 | 0 | 1 | 1 | 0 |
| 1 | 1 | 1 | 1 | 1 | 1 |
| CONTROL INPUT & FEEDBACK | | F/G in CLB R0C0 | | Carry Logic in CLB R0C1 | |

As can been seen in TABLE 1, the logical operation of element 92 (FIG. 8B) is to act as a switch controlled by the line SEL. When line SEL is 0, it gates the RECIRC input through to output FNET, while holding the alternative output GNET to 1. In the reverse situation, when line SEL is 1, it gates the RECIRC input through to output GNET, while holding FNET to 1 (high). The RECIRC input is a single point connection from the output of a CLO cell, and is used to cause the feedback necessary for oscillation. Based on relative placement constraints, the outputs GNET and FNET exchange signals to the CLB one column to the right. This CLB includes the carry logic elements 98 and 96, within element 94.

Referring again to TABLE 1 above, the CY4 carry logic element 98 is programmed by the CY4_21 carry logic element 96 to perform the function INC-G-F1. This function, as shown in the carry logic table in FIG. 4, is normally intended to perform a 1-bit incrementation with logical enable. This would normally be the carry logic for a single bit in a larger binary counter or incrementor having an odd-number of total bits. However, the element 94 works differently when exchanging signals with element 92, in performing a digitally controlled CLO. Referring again to the table of FIG. 4, the CY4_21 carry logic element 96 sets the function INC-G-F1, and this CY4 mode has the following logical relations for the internals of element 98:

TABLE 2

CY4_21 (INC-G-F1) CARRY LOGIC RELATIONS

COUT0 = F1
COUT1 = COUT0 * G4

NOTE: "COUT1" is the same as "COUT" in the schematic capture symbol CY4 depicted in element 98 in FIG. 8B Because the CLB pins F1 and G 4 of element 94 are respectively connected to the lines FNET and GNET source from element 92, the actual logic function performed with element 92 nets can be viewed in the following table (TABLE 3):

TABLE 3

ELEMENT 94 FUNCTION WITH ELEMENT 92 NETS

COUT0 = FNET
COUT1 = FNET * GNET

NOTE: "COUT1" is the same as "COUT" in the schematic capture symbol CY4 depicted in element 98 in FIG. 8B Based on the logical AND of FNET and GNET being performed in element 98, a feedback signal (along net RECIRC), which enters element 92, is recirculated to other CLO cells, by going out of the carry line CLINK0 (via pin COUT) in element 98, and hence to other CLO cells which have been heretofore described. However, the digitally controlled CLO uses a novel mechanism that cannot be shown purely in a functional table.

What is not obvious about the apparent redundancy in TABLE 1 is that depending on the state of SEL, the feedback signal along net RECIRC will ultimately traverse two separate path lengths to emerge at the output terminal CLINK0 with unequal differential delay times. This novel mechanism will now be explained with reference to FIG. 8B. When SEL is 0, the RECIRC signal is transmitted over net FNET. Similarly, when SEL is 1, the RECIRC signal is transmitted over net GNET. The net which does not mimic the RECIRC signal is held high (1), so as to use the AND function indicated in TABLE 2 and TABLE 3 to enable (gate) the alternate signal through to the carry chain output in element 98, the COUT pin, which ultimately emerges as the output signal along net CLINK0 of element 94. The RECIRC signal experiences an approximately equal delay time traversing across nets FNET and GNET, because the RECIRC signal enters as one lone connection to the CLB, connected to both function generators in the CLB using internal interconnections resources having zero differential delay times. Based on proximity in adjacent columns of CLBS, enforced by relative location constraints, net FNET enters the CY4 element 98 at pin F1, and net GNET enters pin G4, using local interconnect resources. The relative skew between GNET and FNET in this manner can be made well under 100 pico-seconds in Xilinx XC4000/E technology, and in any case it is very much smaller than a typical CLB delay, which is about 5 nano-seconds. At the CY4 block 98, however, a differential delay is created by the carry logic. A signal passing through pin F1 (FNET) has approximately 750 pico-seconds longer inertial delay to arrive at pin COUT, than the signal passing through the G1 pin (GNET), due to the carry logic in CY4, when in mode INC-G-F1, as set by element 96.

The element 94 hence functions as a two-step delay line, combining two inputs to one output, and the element 92 functions as a zero-skew selector to route or switch one feedback signal to either of two paths. The mechanism of digitally controlled CLO operation is hence explained as the coupling of two parts into a novel combination: (1) a feedback recirculation selector routing a mirror image of one feedback signal to either of two output ports in a manner having constant differential delay (element 92); and (2) a carry logic cell (element 94) used as a dual delay line comprising two input ports that subsequently merge the mirrored feedback signal into one output line, yet having unequal delays between the two input ports. In this way, a CLO may have a digitally controlled variable frequency of oscillation, and it becomes a fundamental building block necessary to construct a digital phase-locked loop. The dynamic conditions represent by this novel circuit arrangement have the following temporal inequality for correct operation: deltaT(FNET-GNET)<deltaT(CARRY-FNET—

CARRY-GNET)<Tpd(CLB), where the definitions of the terms of this inequality are contained in the following table.

TABLE 4

TIMING INEQUALITIES FOR DYNAMIC OPERATION OF CLO

| TERM | MEANING | TYPICAL VALUES |
|---|---|---|
| deltaT(FNET-GNET) | FNET/GNET skew | <100 pS |
| deltaT (CARRY-FNET - CARRY-GNET) | differential carry delay | 750 pS |
| Tpd (CLB) | function generator delay | 4.5–7 nS |

In block 94, the nets MON0 and MON1 in the CLB simply pass GNET and FNET signals (respectively) through two outputs. These outputs, are constrained by mapping to G-function and F-function generators (respectively). For dynamic action to occur in routing GNET and FNET through the CY4 element 98, these nets must actually connect to the pins of the G-function and F-function generators. These can be dummy logic functions, as will be explained, and the relative placement and mapping are indicated within element 94 as element (U5) 102 paired with buffer element (U15) 103, and element (U6) 104 paired with buffer element (U3) 106. All of the time-dependent and oscillation-related feedback occurs in the CY4 element 98, however, and not in the function generators in the same CLB. Nonetheless, the internal semiconductor wiring is related to both the carry logic and the function generators. Hence, a logical function of any kind is required of the function generators, and a minimal one of a simple pass-through buffer (buffer elements 103 and U6) represents an exemplary embodiment.

In element 94, as the signals MON0 and MON1 merely reflect with a zero-differential time of one CLB delay each of the signals GNET and FNET, a completely novel "event horizon" is realized, allowing dynamic skew adjustment by profitably using the extreme timing locality within closely coupled CLBs in the FPGA device, as taught by this invention. A recirculating feedback pulse edge which enters net RECIRC will emerge at net MON0 and net MON1 with concurrency of action at net CLINK0, since the same feedback pulse races through the carry logic—a mechanism normally used in the FPGA device to accelerate carry propagation, but used here instead for concurrency and precise differential delay timing. This relative timing may be uniquely used in a novel manner for additional benefits in providing low-skew high-frequency clock sources for internal FPGA logic elements.

Additionally, those skilled in the art will realize that the logic functions performed in the function generators mapped by elements 102 and 104 of element 94 could be an alternative one. This could be a logic function such as AND, OR, NAND, NOR, XOR, XNOR, or any combination of these which maps to the function generators in the CLB, including the H-function generator. The alternative embodiment could have only one output in lieu of two, or it could have two different outputs, such as AND/NAND. The alternative embodiment could also incorporate additional inputs from neighboring FPGA logic for any synchronization or gating purpose necessary to use a phase-locked oscillator within the FPGA.

Referring again to FIG. 8B, the various relative placement constraint mechanisms can be detailed further. The FMAP element (U12) 201 and FMAP element (U13) 202 of block 92 are used only to bind the element (U17) 101 and element (U16) 100, respectively, to a lone CLB that is one column to the left of the CLB containing elements (U4) 98, (U14) 96, (U5) 102, (U15) 103, (U6) 104, and (U3) 106. These later elements are similarly bound within a lone CLB, using relative location primitives. Additionally, the logic elements depicted as (U16) 100 and (U17) 101 were selected for the convenience of implementing the logical relations shown in Table 1, from a Xilinx FPGA schematic capture library. Alternative realizations of logic which packs into the F-function and G-function generators, but also fulfill the functions in Table 1 are possible. The packing is controlled by FMAP element (U12) 201 and FMAP element (U13) 202, where respectively, element (U17) 101 is packed into a G-function generator by the declaration RLOC=R0C0.G, via element (U12) 201. Similarly, element (U16) 100 is packed into an F-function generator by the declaration RLOC=R0C0.F, via element (U13) 202.

Referring again to FIG. 8B, the relative placement constraints are respectively in Xilinx XC4000 technology terminology, ROC0 for block 92, R0C1 for block 94. Such constraints ensure that block 92 is situated relatively one CLB column left of block 94, on the same row. Absolute placement of these CLBs is not important to the correct functioning of the circuit, only relative placement to each other, and to additional successor elements comprising a carry logic oscillator.

Reference is now made to FIG. 7A, which shows the CARRYTAP cell (element 88). This cell is similar to a combination of both the CARRYMON cell (element 62 in FIG. 6) and the CARRYPAS cell (element 68 in FIG. 7B). The carry configuration element 80 is a CY4_42 element, which with reference to FIG. 4, is an EXAMNE-CI mode configuration for CY4 element 89. The EXAMINE-CL mode configuration merely passes the carry chain in through the carry logic to the output, having approximately 1.5 nS delay in Xilinx XC4000/E technology. The purpose of this mode is to allow the CLB function generator logic to "examine" the incoming carry, for use as an input to the function generators. The CARRYTAP cell 88 passes the carry chain through the CY4 element 89, via nets CLINK0 (input) and CLINK1 (output), while also "tapping" the carry via buffer (U3) 83, which sources the net CARRY (also an output). This normal CLB output can be used to drive a global buffer in the FPGA, allowing high fanout clock distribution from the place in the CLO where the "tap" is placed.

Given that the primary mechanism of digitally controlled carry logic oscillation is fully described, utilizing the apparatus 90 (FIG. 8B), reference is now made to FIG. 8C, which depicts as element 500 a fully operable digitally controlled variable-frequency CLO, or DCLO.

The DCLO 500 is constructed out of the following building blocks which have been described previously: CARRYSWI, a carry switch, element 90 (see also FIG. 8B); CARRYTAP, a carry tap, element 88 (see also FIG. 7A); CARRYPAS, a carry pass, element 68 (see also FIG. 7B); and CARRYBAR, a carry inversion element 2 (see also FIG. 2). The oscillation loop is primarily through a vertical column of CLBs linked by carry chains, with one general-purpose local interconnect having a single point-to-point connection. In element 500, the oscillation loop can be traced as first originating out of element 90 as net SUBLOOP2, a carry link, which enters element 88. After passing through element 88, the next stage of the oscillation loop emerges as net SUBLOOP1, another carry link, which leaves element 88 and enters element 68. The next stage of the oscillation loop is the net SUBLOOP0, which leaves element 68 and enters element 2, as the last carry link in the chain. Element 2 provides inversion of the carry chain input, sourcing an output through a CLB. This lone single-point feedback path is comprised of single-point connection to element 90, as net LOOP0, the recirculation input to this element. The loop described forms an electrical circuit having a gain of approximately 1 or larger, and has 360-degrees of phase-shift around the loop, allowing oscillation to occur. By virtue of the digital control of the feedback signal through element 90, the oscillation frequency is variable to two states in the exemplary apparatus.

Those skilled in the art will realize that alternative couplings of the elements 90, 88, 68, and 2 could be accomplished, including especially the option to use more than one element for performing a number of alternative embodiments of the DCLO. This includes increasing the number of binary states for controlling the oscillation frequency by additional instances of element 90, alternative choice in the raw frequency of oscillations, as set by the number of elements 88 and 68, and alternative placements of additional elements 88 for arraying the phases of pulses distributed through the carry logic chain for frequency synthesis and time skew correction for clocked logic circuits within the FPGA device.

Element 501 is a test monitoring apparatus which functions as similarly described above for the test monitoring apparatus in FIG. 1. The element 550 is a simple binary counter which performs the function of monitoring the CLO oscillations after buffering through the global secondary buffer 502. The element 552 performs the function of inverting the binary count value of element 550 for display on LEDs and at external connection terminals on a laboratory test board. The LEDs and external connection terminals are driven outside the FPGA device with elements (OPAD) 566–576 which are coupled respectively to buffers 554–564. The DCLO shown in FIG. 8C does not rely on elements 550, 552, 554–564, and 566–576 for operation; these elements are merely for laboratory demonstration on test boards such as those manufactured by Xilinx, Inc. It is further noted that in FIG. 8C, only 6 of the bits are displayed as LEDs on a Xilinx development board, so that two of the 8 LEDs (i.e., coupled to elements 578 and 580) could be used as part of element 504 to watch the signals MON0 and MON1 from element 90.

Element 502 is a global secondary buffer for allowing the DCLO element 500 to have a high fanout clock distribution capability. Element 503 uses the internal Xilinx oscillator block OSC4 (element (U37) 602 in FIG. 8C) and a counter (U39) 603 to generate a very slow internal test signal, dividing the nominal 15 Hertz signal from the oscillator block OSC4 (U37) 602 by 16. This enables "wiggling" at the DCLO control line SEL at slightly longer than 1 second, so that an averaging frequency counter could be used long enough to verify that the +750 pS/1.5 nS digitally controlled incremental delay caused by element 90 was actually working, and that the frequency produced was stable, changing instantly with SEL, without any frequency transients.

Figure 9:
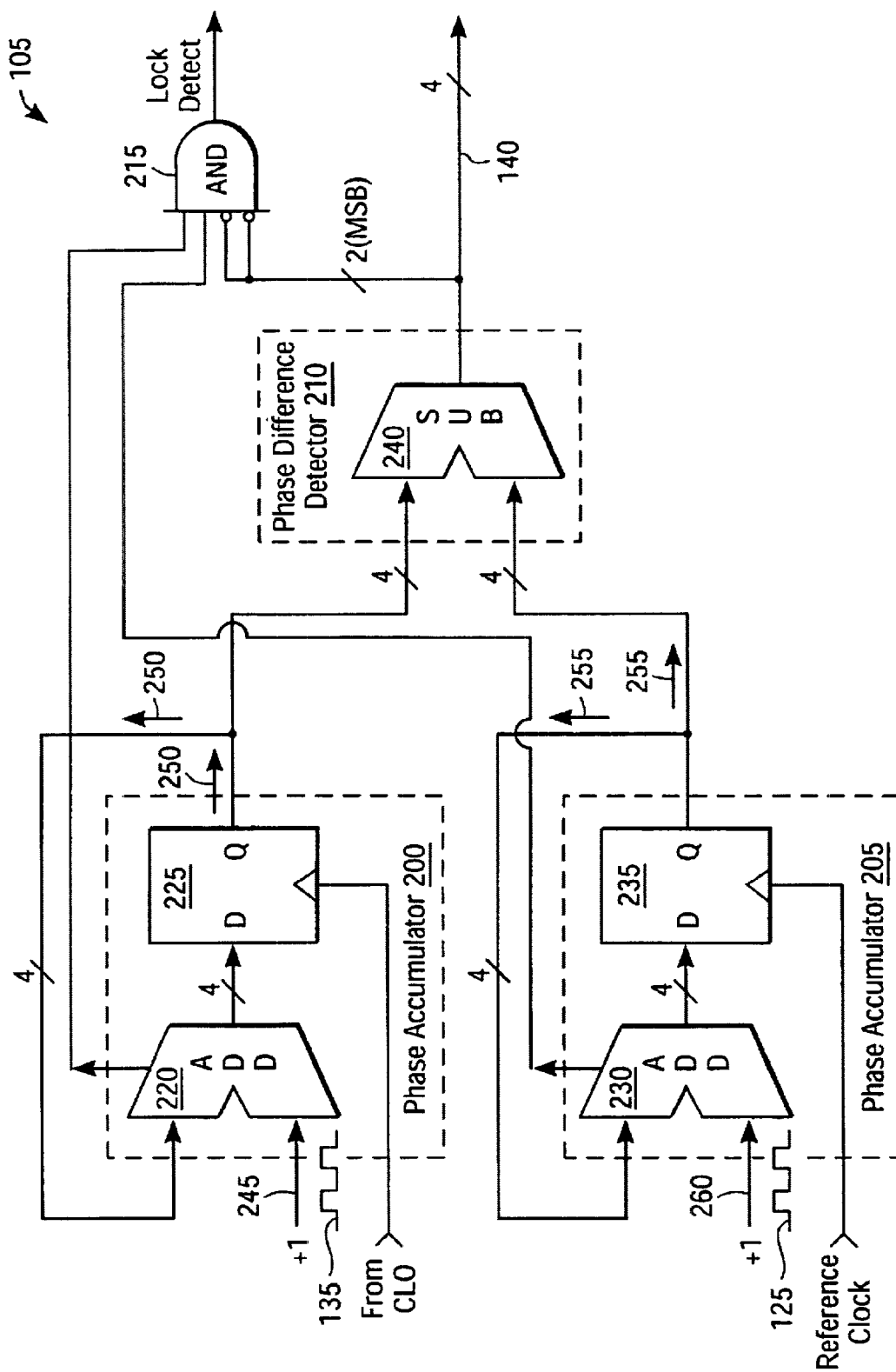
FIG. 9 is a schematic block diagram of a phase detector in accordance with an embodiment of the present invention.

FIG. 9 shows a schematic circuit diagram of the phase detector 105 in accordance with the phase locked loop of the present invention. The phase detector apparatus 105 comprises a set of logic devices operationally coupled as shown in FIG. 9. The phase detector 105 includes phase accumulators 200 and 205, phase difference detector 210, and lock detect stage 215. The phase accumulator 200 includes an adder 220 and a D-type flip-flop 225, while the phase accumulator 205 includes an adder 230 and a D-type flip-flop 235. The phase difference detector 210 includes a subtractor 240, while the lock detect stage 215 may be implemented by, for example, an AND gate. During operation, a carry logic oscillator (such as one of the embodiments previously described above) drives the phase accumulator 200. The adder 220 receives the phase accumulator value 250 from flip-flop 225 and an input signal 245 which is at a "1" value. The flip-flop 225 value increments for each pulse detected in the control signal 135 from the control logic oscillator. The phase accumulator value 250 is also received by the phase difference detector 240. A preset frequency source (which may be external to the FPGA) drives the phase accumulator 205. The adder 230 receives the phase accumulator value 255 of flip-flop 235 and an input signal 260 which is at a "1" value. The flip-flop 235 value increments for each pulse detected in the reference clock signal 125. The phase accumulator value 255 is also received by the phase difference detector 210. The lock detect stage 215 determines and compares acyclically the difference between the internally accumulated phase values stored in phase accumulator 200 and phase accumulator 205. This difference represents the phase difference between the reference clock 125 and the CLO signal 135. When phase lock occurs, the phase difference detector 210 outputs a constant value. When phase lock occurs with a zero phase difference between the reference clock 125 and CLO signal 135, the phase difference detector outputs a "0" value.

As a result, the lock detect stage 215 receives input signals each having a "1" value and outputs a LOCK DETECT signal with a "1" value to indicate a phase lock condition. An additional post processing stage (not shown) may be coupled to the output of phase difference detector 215. A small jitter may appear in the wavefront of the CLO signal and is received by the least significant bits if the phase difference detector 210. Therefore, the most significant bits of the CLO signal may be taken at the most significant bit of the phase difference detector.

The phase-detector apparatus 105 is for a PLL built for controlled DLLs. The particular application is locking an internal controlled-CLO to a preset frequency source that is external to the FPGA. The phase-detector apparatus 105 is novel because it allows a fully digital PLL to be constructed using only the FPGA's internal conventional resources, by using them in unconventional ways. This invention also requires no extra or specialized logic, nor does it require external analog circuits. It trades a smaller number of acceptable phase-lock frequencies, some small phase jitter, and extremely fast intra-oscillator computational logic packing, for dedicated special circuits such as internal DLLs (Virtex FPGAs) or outboard analog components for less costly older FPGAs.

Thus, while the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

What is claimed is:

1. An apparatus for performing phase-lock in a field programmable gate array, the apparatus comprising:
    a phase detector configured to determine a phase difference between a carry logic oscillator signal and a reference clock signal; and
    a carry logic oscillator coupled to the phase detector and configured to generate the carry logic oscillator signal, the carry logic oscillator including a first column of carry logic cells and a second column of carry logic cells coupled together by a feedback loop for enabling quadrature phasing, the carry logic oscillator further including a logic gate coupled to the first column and the second column, the logic gate enabling a frequency multiplication function.

2. A carry logic oscillator implemented in a field programmable gate array, comprising:

a first plurality of carry logic cells disposed along a first column;

a second plurality of carry logic cells disposed along a second column adjacent to the first column; and a feedback loop coupled between one of the carry logic cells in the first column and one of the carry logic cells in the second column;

wherein the carry logic cells in the first column and in the second column function to generate quadrature-timed waveforms.

3. The carry logic oscillator of claim 2, further comprising:

an XOR gate coupled to one of the carry logic cells in the first column and one of the carry logic cells in the second column to enable a frequency multiplication function.

4. A digitally-controlled variable-frequency carry logic oscillator in a field programmable gate array, comprising:

a plurality of carry logic blocks coupled in series;

the plurality of carry logic blocks including a first carry logic block and a last carry logic block, the first carry logic block coupled by a feedback line to the last carry logic block;

wherein the plurality of carry logic blocks enable an oscillation function in the field programmable gate array;

wherein the last carry logic block is configured to switch an input signal from a first delay path to a second delay path to enable a variable frequency.

5. The digitally-controlled variable-frequency carry logic oscillator of claim 4 wherein the last carry logic block comprises:

a combinational circuit configured to switch the input signal onto either the first delay path or the second delay path; and a carry logic delay circuit coupled to the combinational circuit, the carry logic delay circuit configured to produce a differential delay between the first delay path and the second delay path to enable the variable frequency.

6. The digitally-controlled variable-frequency carry logic oscillator of claim 4 wherein the last carry logic block comprises:

a carry logic element; and a configuration element coupled to the carry logic element and configured to control the function of the carry logic element, the carry logic element enabling a differential delay between the first delay path and the second delay path to enable the variable frequency.

7. A carry logic oscillator implemented in a field programmable gate array, comprising:

a first carry cell, the first carry cell comprising a carry logic element, a configuration element coupled to the carry logic element and configured to control the function of the carry logic element, an inverter coupled to the carry logic element, and an FMAP element coupled to the carry logic element and configured to associate the carry logic element and the configuration element with the inverter; and a second carry cell coupled to the first carry cell by a carry logic net and a feedback net, the first carry cell and second carry cell configured to permit an oscillation function in the field programmable gate array, the second carry cell including a frequency output for generating the oscillation function.

8. A carry logic oscillator implemented in a field programmable gate array, comprising:

a first carry cell; and a second carry cell coupled to the first carry cell by a carry logic net and a feedback net, the first carry cell and second carry cell configured to permit an oscillation function in the field programmable gate array, the second carry cell including a frequency output for generating the oscillation function;

wherein the second carry cell comprises a second carry logic element, a second configuration element coupled to the second carry logic element and configured to control the function of the second carry logic element, a second FMAP element coupled to the second carry logic element, and an AND gate coupled to the second FMAP element, the second FMAP element and the AND gate forming a function generator.

9. An apparatus for performing phase-lock in a field programmable gate array, the apparatus comprising:

a phase detector configured to determine a phase difference between a carry logic oscillator signal and a reference clock signal; and a circuit coupled to the phase detector, and adapted to function as a digitally-controlled variable-frequency carry logic oscillator, and further configured to generate the carry logic oscillator signal.

10. The apparatus for performing phase-lock of claim 9 wherein the circuit is further configured to switch a signal from a first delay path to a second delay path to enable a variable frequency.

11. The apparatus for performing phase-lock of claim 9 wherein the circuit comprises a carry logic element configured to produce a differential delay between a first delay path and a second delay path to enable a variable frequency.

12. The apparatus for performing phase-lock of claim 9 wherein the circuit comprises:

a plurality of carry logic blocks coupled in series to generate the carry logic oscillator signal, the plurality of carry logic blocks including a first carry logic block coupled by a feedback line to a last carry logic block, the last carry logic block including a carry logic element configured to produce a differential delay between a first input and a second input to enable a variable frequency.

13. The apparatus for performing phase-lock of claim 9 wherein the circuit comprises:

a carry logic element configured to produce a differential delay between a first delay path and a second delay path;

a configuration element coupled to the carry logic element and configured to control the function of the carry logic element;

a first function generator including a first logic circuit coupled to the carry logic element;

a first FMAP element coupled to the first logic circuit and configured to associate the first function generator with the first delay path;

a second function generator including a second logic circuit coupled to the carry logic element; and a second FMAP element coupled to the second logic circuit and configured to associate the second function generator with the second delay path.

14. The apparatus for performing phase-lock of claim 9 wherein the phase detector comprises:

a first phase accumulator coupled between the circuit and a phase difference detector;

a second phase accumulator coupled to the phase difference detector and configured to receive the reference clock signal; and a lock detector coupled to the first phase accumulator, the second phase accumulator, and the phase difference detector.

15. A method of performing phase-lock in a field programmable gate array, the method comprising the steps of:

using a carry logic oscillator in a field programmable gate array to generate a carry logic oscillator signal;

digitally selecting a base frequency for the carry logic oscillator signal; and determining a phase difference between the carry logic oscillator signal and a reference clock signal.

16. The method of claim 15 wherein the step of using a carry logic oscillator in a field programmable gate array to generate a carry logic oscillator signal comprises the sub-steps of:

coupling a plurality of carry logic blocks in a field programmable gate array in series; and using a loop delay through the plurality of carry logic blocks to set the base frequency for oscillation.

17. The method of claim 15 wherein step of digitally selecting a base frequency for the carry logic oscillator signal comprises the sub-steps of:

establishing a first delay path with a first delay time and a second delay path with a second delay time; and switching a feedback signal to either the first delay path or the second delay path.

18. The method of claim 17 further comprising the step of recombining the first delay path and the second delay path.

19. The method of claim 15 wherein the step of digitally selecting a base frequency for the carry logic oscillator signal comprises the sub-steps of:

routing a mirror image of a feedback signal to either of two output ports in a manner having constant differential delay;

using a carry logic cell as a dual delay line with two input ports having unequal delays; and merging the mirror image of the feedback signal into one output line.

* * * * *